US005790691A

United States Patent [19]
Narayanswamy et al.

[11] Patent Number: 5,790,691
[45] Date of Patent: Aug. 4, 1998

[54] METHOD AND APPARATUS FOR ROBUST SHAPE DETECTION USING A HIT/MISS TRANSFORM

[75] Inventors: Ram Narayanswamy, Boulder; Kristina M. Johnson, Longmont, both of Colo.

[73] Assignee: The Regents of the University of Colorado, Boulder, Colo.

[21] Appl. No.: 614,852

[22] Filed: Mar. 12, 1996

[51] Int. Cl.$^6$ .................................................. G06K 9/00
[52] U.S. Cl. ........................... 382/133; 382/211; 382/219
[58] Field of Search ..................... 382/128, 133, 382/205, 210, 211, 212, 213, 219, 308; 128/922

[56] References Cited

U.S. PATENT DOCUMENTS

| | | | |
|---|---|---|---|
| 5,093,866 | 3/1992 | Douglas-Hamilton et al. | 382/6 |
| 5,430,807 | 7/1995 | Gravely | 382/128 |
| 5,627,915 | 5/1997 | Rosser et al. | 382/219 |
| 5,633,944 | 5/1997 | Guibert et al. | 382/100 |

FOREIGN PATENT DOCUMENTS 0 517 344  12/1992  European Pat. Off. ............... 382/210

OTHER PUBLICATIONS

Casasent, D., et al., "Optical hit-miss morphological transform," Applied Optics/vol. 31, No. 29, 10 Oct. 1992, pp. 6255–6263.

Crimmins, T.R., et al., "Image Algebra and Automatic Shape Recognition," vol. AES-21, No. 1 of IEEE Transactions On Aerospace And Electronic Systems, pp. 60–68 (1985).

McKnight, Douglas J., et al., "256 x 256 liquid-crysatl-on-silicon spatial light modulator," Applied Optics/vol. 33, No. 14, 10 May 1994, pp. 2775–2784.

Narayanswamy, R., et al., "Optoelectronic hit/miss transform for screening cervical smear slides," Optics Letters, vol. 20, No. 12, Jun. 15, 1995, pp. 1362–1364.

Narayanswamy, R., et al., "Optoelectronic morphological processor for cervical cancer screening," Conference of Optical Computing, vol. 10, Mar. 13–16, 1995, Salt Lake City, Utah.

Turner, R.M., et al., "CMOS Photodetectors for Correlation Peak Location," IEEE Photonics Technol. Letts., vol. 6, No. 4, Apr. 1994, pp. 552–554.

Narayanswamy, R., et al., "Optoelectronic region of interest detection in cervical smears," Abstract for Optical Computing Meeting, Apr. 21–23, 1996, 2 pages.

Partin et al., "Use of an Interference Contrast Microscope in a Coherent Optical Processor," SPIE vol. 177 Optical Information Storage (1979), pp. 50–53.

Partin et al., "Spectral Analysis of Microscopic Phase Objects for Matched Filter Optimization," SPIE vol. 185 Optical Processing Systems (1979), pp. 159–162.

*Primary Examiner*—Andrew W. Jones
*Attorney, Agent, or Firm*—Fleshner & Kim

[57] ABSTRACT

An apparatus and method for detecting anomalies morphologically detecting regions of interest. The apparatus and method include a region of interest (ROI) detection unit which morphologically detects anomalies in two dimensional input images or morphologically detects regions of interest based on structuring elements which can be set by a user using a modified hit and miss transform which includes a thresholding feature. The thresholding feature makes it possible to vary how much the shape of features within the input images can deviate from the shape of structuring elements and still be detected as a region of interest. One application of this involves detection of abnormal cells in a cervical Pap-smear.

39 Claims, 20 Drawing Sheets

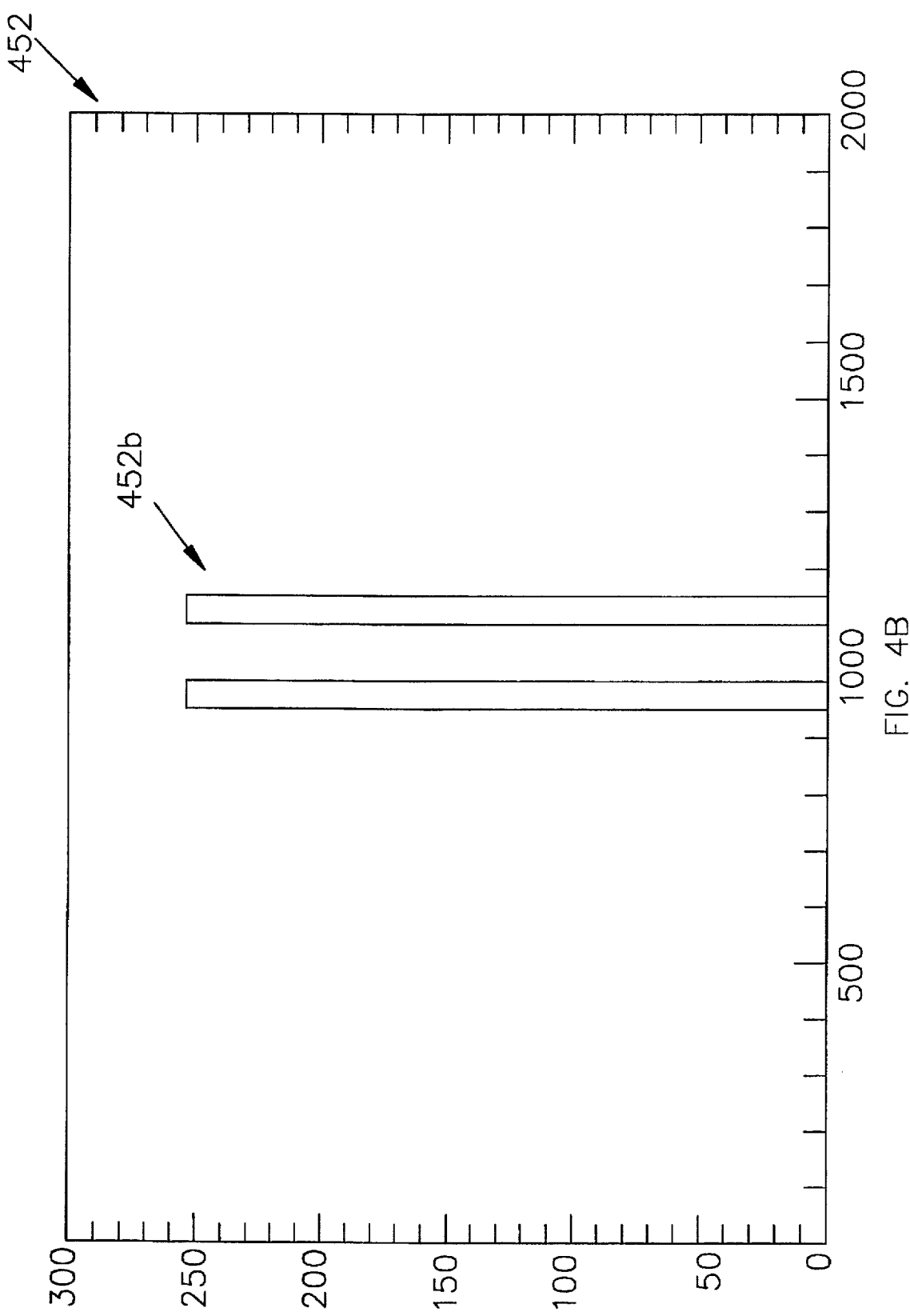

METHOD AND APPARATUS FOR ROBUST SHAPE DETECTION USING A HIT/MISS TRANSFORM

BACKGROUND OF THE INVENTION

1. Field of the Invention

This invention relates generally to an apparatus and method for detecting anomalies in a given data stream. In particular, the invention relates to an apparatus and method for detecting regions of interest based on morphology. In one embodiment, the invention relates to a method and apparatus for morphologically detecting presence of abnormal cells among a group of cells.

2. Background of the Related Art

Optical inspection involves monitoring visual data recognizing anomalies in a given data stream. Currently, such inspection is done using charged coupled device (CCD) cameras to acquire the image data and a digital computer to process the data. However, this approach suffers from data bottleneck at the camera. For example, images which are inherently two dimensional (2D) have to be converted by the camera into one-dimensional (1D) data stream for transporting to a digital computer where they have to be recreated into a 2D array for further examination. Another drawback to the above approach is the requirement to be able to store a large number of data vectors only to be discarded after the initial processing.

Current optical inspection methods and devices are based on matched filters where shapes are predominantly recognized based on their edges. Shape recognition is performed by correlating the target with a library of edge enhanced shapes. In particular, an exhaustive search must be performed to recognize whether the image in question contains any shapes stored in the entire library of shapes. This edge based approach, however, is particularly susceptible to error due to the occurrence of small edge noise, small rotation, or variations of scale.

Optical inspection methods can be used in a variety of areas where shape, size and optical density are to be monitored in medical diagnosis arenas, manufacturing, and many others.

One such medical application involves detection of abnormal regions in Pap-smears. Pap-smears are slides of cellular material used to screen for cervical cancer. It is recommended that women have a test for cervical cancer every year. The test involves preparation of a slide with cellular samples obtained from the cervix. All such slides are sent to a cytologist, who examines each slide under a microscope, typically for 10–15 minutes and makes a determination if the slide is normal or abnormal. Each slide can contain up to 100,000 cells and it is estimated that more than 90% of the slides examined by a cytologist are normal. Since the nature of this microscope based examination is tedious and repetitive, it results in false negative rates, (incorrect diagnosis of a slide displaying abnormal cells) in excess of 17%.

Automated Pap-smear examination is desirable as a quality control mechanism for detecting abnormal slides (that is, slides which contain at least one abnormal cell among normal cells) that are missed by human inspection and also as a primary diagnostic cytology screen. However, automated screening is challenging because features of interest are often hidden in a vast search area. For example, in a Pap-smear, one in 10,000 cells may be abnormal. Detecting the one cell requires high computation power and throughput.

Attempts to detect defective cells involves using integrated-optical density or template matching have been found to be unsuitable. Although, the integrated-optical density method is simple and fast, but it is insensitive to feature shape and hence cannot discriminate between abnormal nuclei and dark areas that result from overlapping cells. Given the complexity of the Pap-smear images, a single level linear classifier (template matching) cannot provide the high detection rates for abnormal cells while keeping the false alarm (normally identified as abnormal) very low. "Rare events or "needle-in-a-haystack" applications such as this require multiple levels of processing to deliver the speed and performance required. Typically the first level implements simple, high speed algorithms which can "intelligently eliminate" all the normal data and retain for further processing only that data which shows signs of abnormality.

Another attempt to detect defective cells involves template matching by the use of a bank of filters. This approach, however, not only requires extensive post processing, but also fails to discriminate between normal and abnormal areas in the presence of clutter.

SUMMARY OF THE INVENTION

It is therefore an object of the invention to provide an apparatus and method for morphologically detecting regions of interest and eliminating the normal regions using mathematical morphology.

Another object of the invention is to provide an apparatus and method for detecting anomalies in data at high data rates.

Another object of the invention is to provide an apparatus and method for determining the presence or absence of an event when the event is rare.

Another object of the invention is to provide a method and apparatus for detecting abnormal cells on a Pap-smear.

Another object of the invention is to provide an apparatus and method for inspecting parts on a conveyer belt.

Another object of the invention is to provide an apparatus and method for detecting lesions in mamograms.

Another object of the invention is to provide an apparatus and method for searching for some shape in a database of images.

Another object of the invention is to provide an apparatus and method for monitoring any scene for the presence of specified shapes.

One advantage of the invention is that it can be used for inspection applications requiring high data rates.

Another advantage of the invention is that it is more robust to edge noise or small rotations or small changes in scale compared to matched filter type systems.

Another advantage of the invention is that the hit and miss filters can be designed using a systematic set of rules, as opposed to ad-hoc opimization techniques used in template matching which need to be redone for every new application. This saves design and testing time and efforts.

Another advantage of the invention is that the invention uses just two filters to detect a range of shapes, namely the hit filter (superset detector) and the miss filter (subset detector) and hence is computationally less intensive than search through a library of templates.

Another advantage of the invention is that modification of the threshold values for the superset detector and the subset detector, varies the detection rate and false alarm rate of the apparatus and method depending on the particular application.

Another advantage of the invention is that it does not require a large library of shapes that must be searched.

Another advantage of the invention is that it can maintain the image data in 2 dimensional form thereby avoiding bottle-necks that can occur with CCD devices.

Another advantage of the invention is that it does not require electronic processing until the postprocessing unit indicates the image to be a region of interest thereby reducing the required storage resources.

Another advantage of the invention is that the optoelectronic processor is much simpler compared to high end electronic systems necessary to perform similar tasks.

Another advantage of the invention is that it has the potential of relatively low cost to produce.

One feature of the invention is that the ROI detection unit implements a hit-miss transform (HMT).

Another feature of the invention is that it can include a data acquisition unit.

Another feature of the invention is that it can include a data processing unit.

Another feature of the invention is that it includes a region-of-interest (ROI) detection unit which can be implemented as an all optical processor, an all electronic processor, or as a hybrid optoelectronic processor.

Another feature of the invention is that it includes a post-processing unit which determines the presence/absence of an ROI.

Another feature of the invention is that it can include a display unit or storage unit to display or store the ROI.

Another feature of the invention is that it detects shapes based on the superset/subset concept of the hit-miss morphological transform.

These and other objects, advantages and features are accomplished by the provision of an apparatus for detecting regions of interest in input data, comprising: a hit correlator which includes a hit thresholder, said hit correlator receiving the input data and performing a modified hit transform on said input data and outputting resulting thresholded hit data; a miss correlator which includes a miss thresholder, said miss correlator receiving the input data and performing a modified miss transform on said input data and outputting resulting thresholded miss data; and logically ANDing said resulting thresholded hit data and said resulting thresholded miss data and outputting resulting region of interest data.

These and other objects, advantages and features are accomplished by the provision of a system for identifying regions of interest, comprising: a data acquisition unit for acquiring image data; a data preprocessing unit for receiving said image data and processing said image data to yield processed image data; a region of interest processing unit for receiving and performing a modified hit/miss transform on said processed image data, whereby said modified hit/miss transform incorporates thresholding, and for outputting resulting region of interest data.

These objects, advantages and features are further achieved when the above region of interest processing unit comprises a hit correlator and thresholder, which receives said processed image data and processes a hit transform and a hit threshold on said processed image data based on a hit kernel and a hit threshold value.

These and other objects, advantages and features are also achieved by the provision of a method for detecting regions of interest in input data, comprising: receiving the input data; performing a modified hit transform on said input data to yield resulting thresholded hit data; performing a modified miss transform on said input data and outputting resulting thresholded miss data; and logically ANDing said resulting thresholded hit data and said resulting thresholded miss data and outputting resulting region of interest data.

These and other objects, advantages and features are also accomplished by the provision of a method for identifying regions of interest, comprising: acquiring image data based on radiation scattered from a view; performing a hit correlation using a hit kernel to yield hit transform data; thresholding said hit transform data to yield modified hit transform data of the view; performing a miss correlation using a miss kernel to yield miss transform data; thresholding said miss transform data to yield modified miss transform data of the view; and outputting data approximately common to said modified hit transform data and said modified miss transform data to yield resulting region of interest data.

These and other objects, advantages and features are also accomplished by the provision of a method for identifying regions of interest, comprising: acquiring image data based on radiation scattered from a view; performing a hit correlation using a hit kernel to yield hit transform data; thresholding said hit transform data to yield modified hit transform data of the view; performing a miss correlation using a miss kernel to yield miss transform data; thresholding said miss transform data to yield modified miss transform data of the view; and logically ANDing said modified hit transform data and said modified miss transform data to yield resulting region of interest data.

These and other objects, advantages and features are also accomplished by an apparatus for detecting regions of interest in a Pap-smear slide, comprising: an optical hit correlator which includes a hit thresholder, said optical hit correlator receiving optical radiation with input data modulated thereon by passing through the Pap-smear slide and performing a modified hit transform on said optical radiation and outputting optical radiation with resulting thresholded hit data modulated thereon; an optical miss correlator which includes a miss thresholder, said optical miss correlator also receiving said optical radiation with input data modulated thereon and performing a modified miss transform on said optical radiation and outputting optical radiation with resulting thresholded miss data modulated thereon; and logically ANDing said optical radiation with resulting thresholded hit data modulated thereon and said optical radiation with resulting thresholded miss data modulated thereon and outputting optical radiation with resulting region of interest data modulated thereon.

These and other objects, advantages and features are also accomplished by the provision of a method for detecting regions of interest in a Pap-smear slide, comprising: passing optical radiation through the Pap-smear slide to yield modulated optical radiation with input data modulated thereon; receiving and performing a modified hit transform on said optical radiation and outputting hit optical radiation with resulting thresholded hit data modulated thereon; receiving and performing a modified miss transform on said optical radiation and outputting miss optical radiation with resulting thresholded miss data modulated thereon; and logically ANDing said hit optical radiation and said miss optical radiation and outputting optical radiation with resulting region of interest data modulated thereon.

The above and other objects, advantages and features of the invention will become more apparent from the following description thereof taken in conjunction with the accompanying drawings.

BRIEF DESCRIPTION OF THE DRAWINGS

FIG. 4A shows a hit correlation kernel and FIG. 4B shows a miss correlation kernel for the example input of FIG. 3A.

DETAILED DESCRIPTION OF PREFERRED EMBODIMENTS

Figure 1:
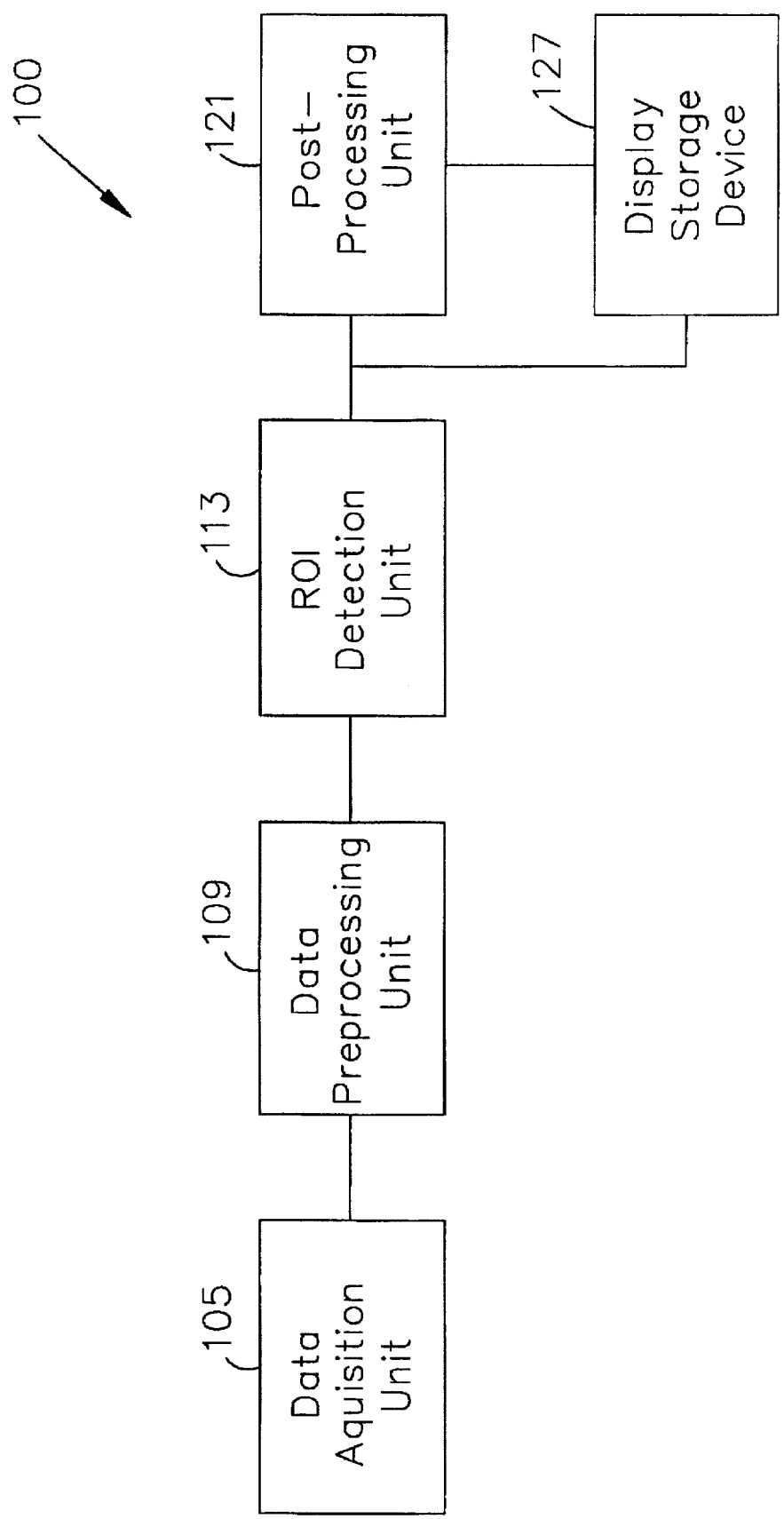
FIG. 1 shows a morphological detection system according to one embodiment of the invention.

FIG. 1 shows a morphological detection system 100 according to an embodiment of the invention. System 100 includes a data acquisition unit 105 that receives image data. The image data can be acquired using coherent or incoherent radiation. The image data is then output from data acquisition unit 105 to data preprocessing unit 109 which includes certain filtering and/or thresholding capabilities. Preprocessing unit 109 receives the image data and filters certain wavelengths and/or thresholding the image data to yield preprocessed image data which is ready to be received by the region of interest (ROI) detection unit 113. A more detailed discussion of various embodiments of data acquisition unit 105 and data preprocessing unit 109 will be provided below.

ROI detection unit 113 can be implemented as an all electronic processor, an all optical processor, or a hybrid optoelectronic processor as will be discussed in detail below. ROI detection unit 113 receives the preprocessed image data and performs a morphological region of interest (ROI) detection which will be discussed in detail below. Morphological region of interest detection involves recognizing anomalies in the preprocessed image data. The preprocessed image data can be in 2 dimensional format and ROI detection unit 113 determines whether or not a each 2 dimensional preprocessed image output from unit 109 satisfies some initial criterion (or criteria) based on size or shape measurements. ROI detection unit 113 can be made to retain only those images which satisfy that initial criterion. This image data will be referred to here as regions of interest (ROI) data, where the term ROI data only signifies that the initial criterion was met and that there is a possibility that an ROI is present. Since ROI detection unit 113 outputs only ROI data, the bandwidth requirements of postprocessing unit 121 which receives the ROI data is significantly reduced, provided the initial criterion is satisfied a low percentage of the time.

Postprocessing unit 121 receives the ROI data and processes that ROI data to determine the presence or absence of the region of interest as well as its location in the image. A display/storage device 127 can either receive the ROI data directly from unit 113 or can receive the processed data from unit 121 and display and/or store the entire image or perhaps only the region of interest.

Particular embodiments of data acquisition unit 105 and data preprocessing unit 109 will be addressed, but first, the processes performed by ROI detection unit 113 which includes a modified morphological hit/miss transform (HMT) performed by unit 113 will be explained. A general discussion of the classic HMT is provided in "Optical hit-miss morphological transform", by Casasent, et al. Vol. 31, No. 29 Applied Optics pp. 6255–6263, (10 Oct. 1992), and "Image Algebra and Automatic Shape Recognition" by T. R. Crimmins and W. M. Brown, Vol. AES-21 No. 1 of IEEE TRANSACTIONS ON AEROSPACE AND ELECTRONIC SYSTEMS pp 60–68, (1985), the contents of both of which are incorporated herein by reference. Step 201 involves receiving the preprocessed image data from preprocessing unit 109. At step 205, ROI detection unit 113 performs a modified "hit" operation with that image which detects supersets and accomplishes a first thresholding step. In particular, step 205 involves detecting any feature in the image which is larger than a specified size and shape and saves the resulting data as hit data. At step 205, ROI detection unit 113 performs a modified "miss" operation received at ROI detection unit 113, wherein the "miss" operation detects subsets and accomplishes a second thresholding step. In particular, step 211 detects any feature in the image which is smaller than a specified size or shape and saving the resulting data as miss data. Step 216 then involves logically ANDing the results of steps 205 and 211, i.e., logically ANDing the hit and miss data.

Figure 4A:
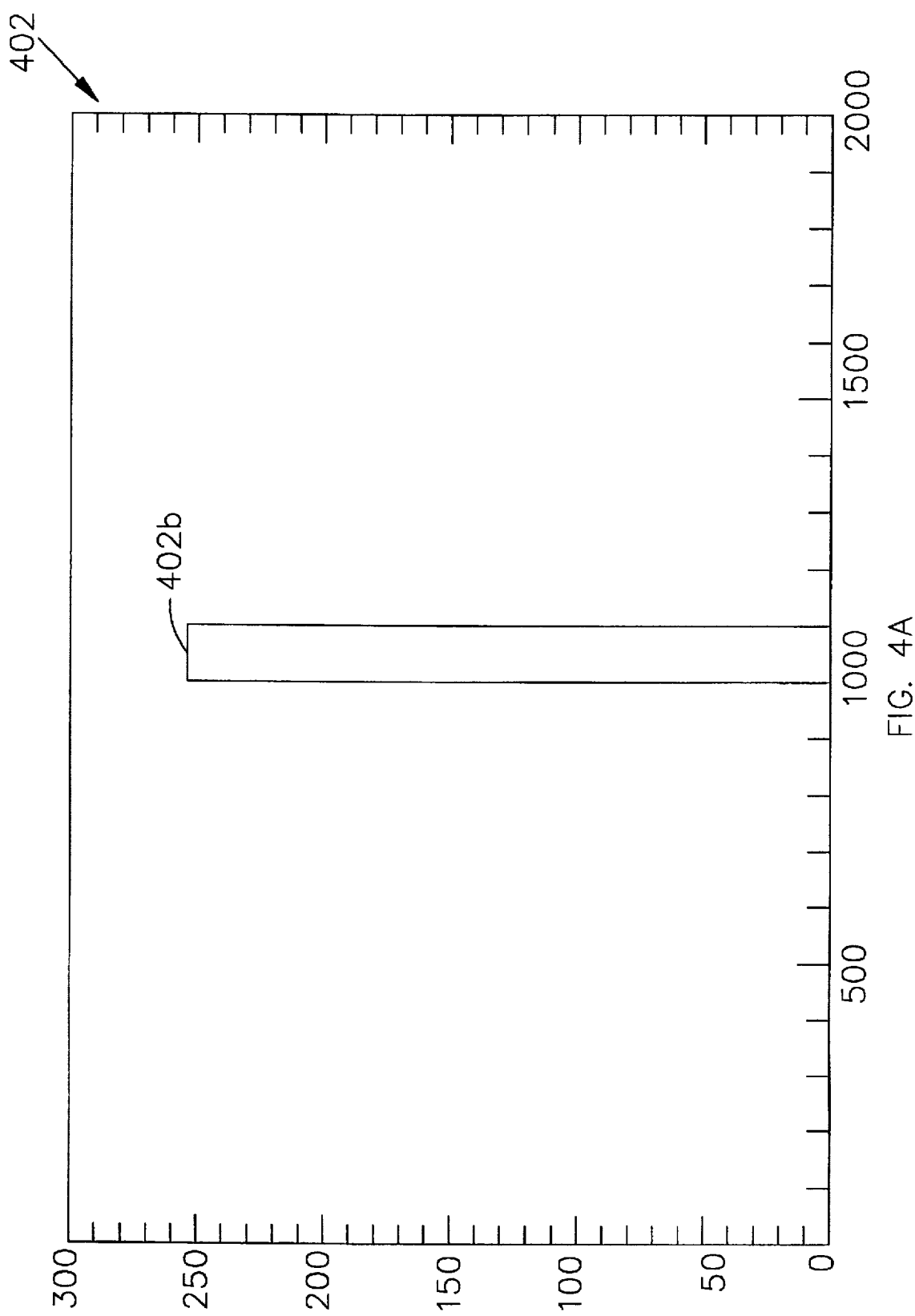
Figure 5A:
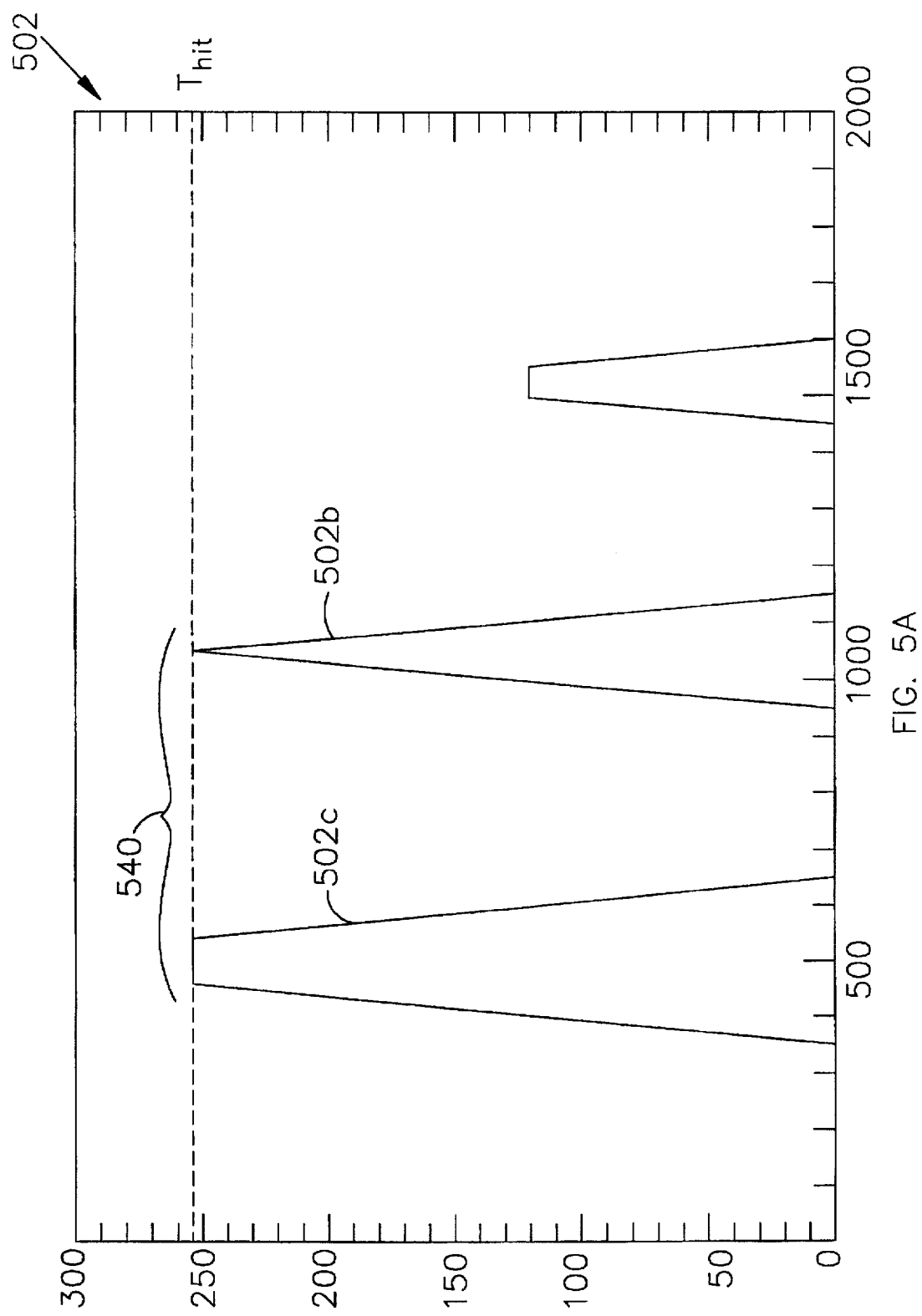
FIG. 5A shows the correlation of the input image of FIG. 3A with the hit correlation kernel of FIG. 4A.
Figure 5B:
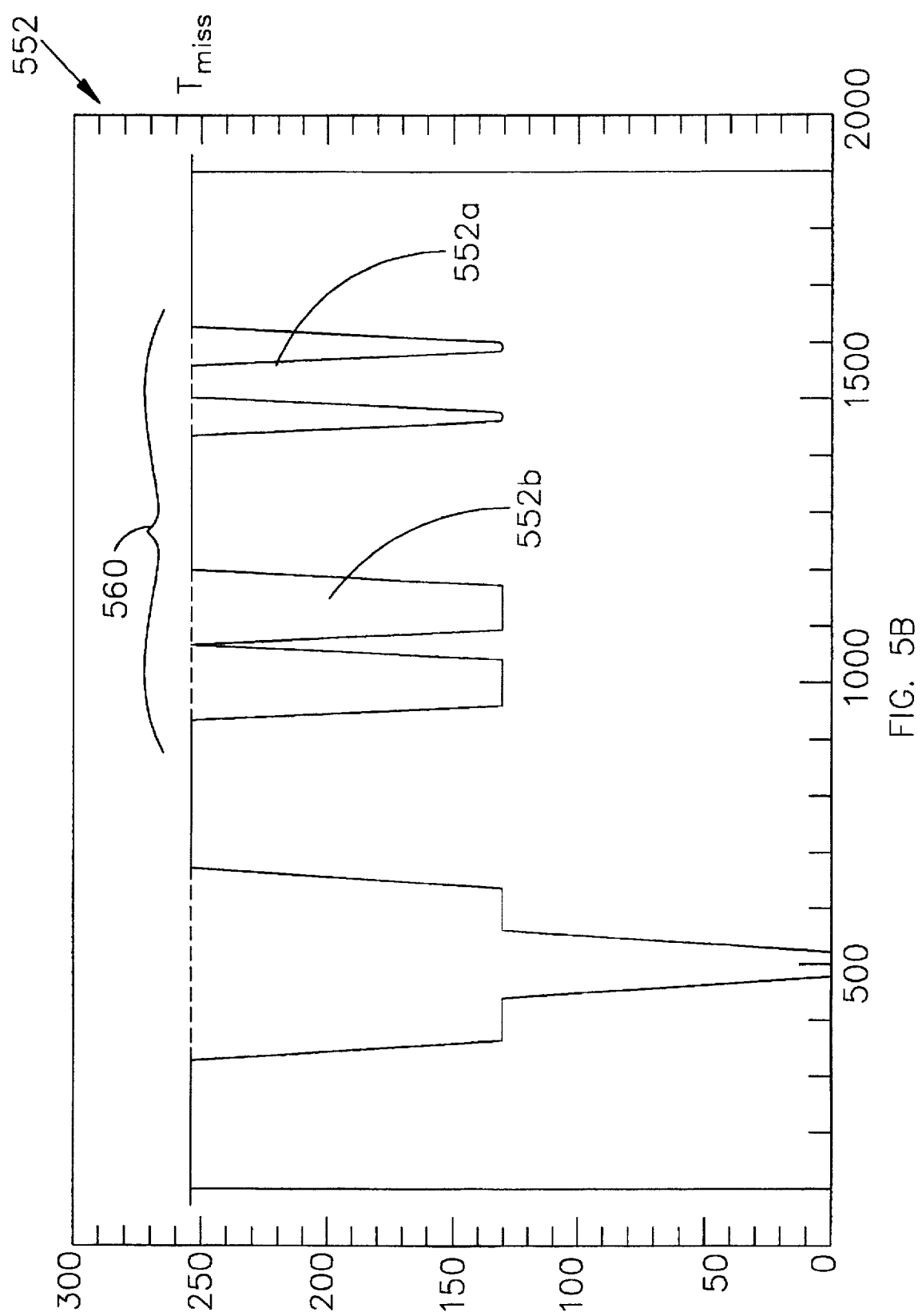
FIG. 5B shows the correlation of the contrast reverse image of FIG. 3B with the miss correlation kernel of FIG. 4B.
Figure 6:
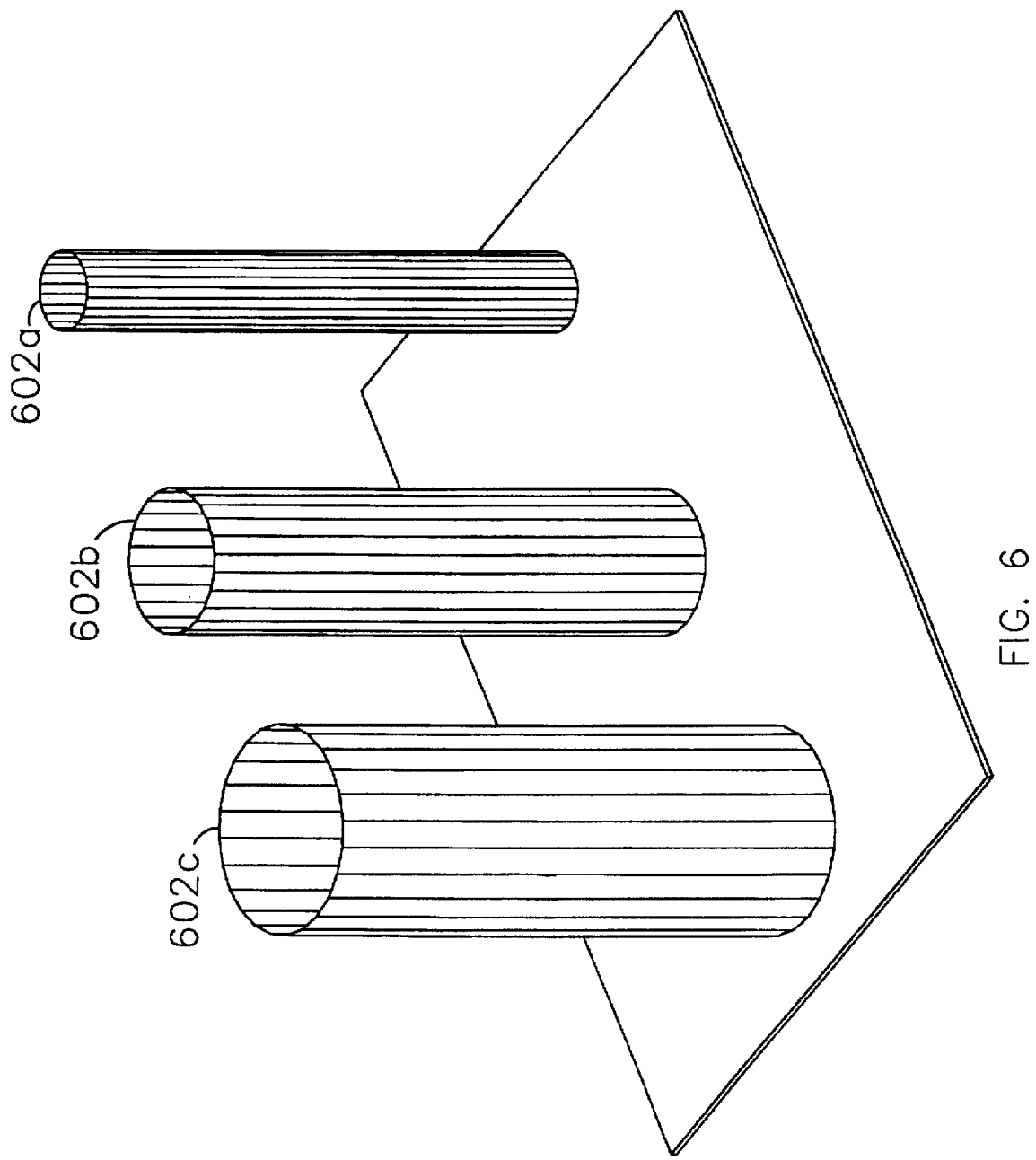
FIG. 6 shows the two dimensional images corresponding to FIG. 3A versus intensity (z axis).
Figure 7A:
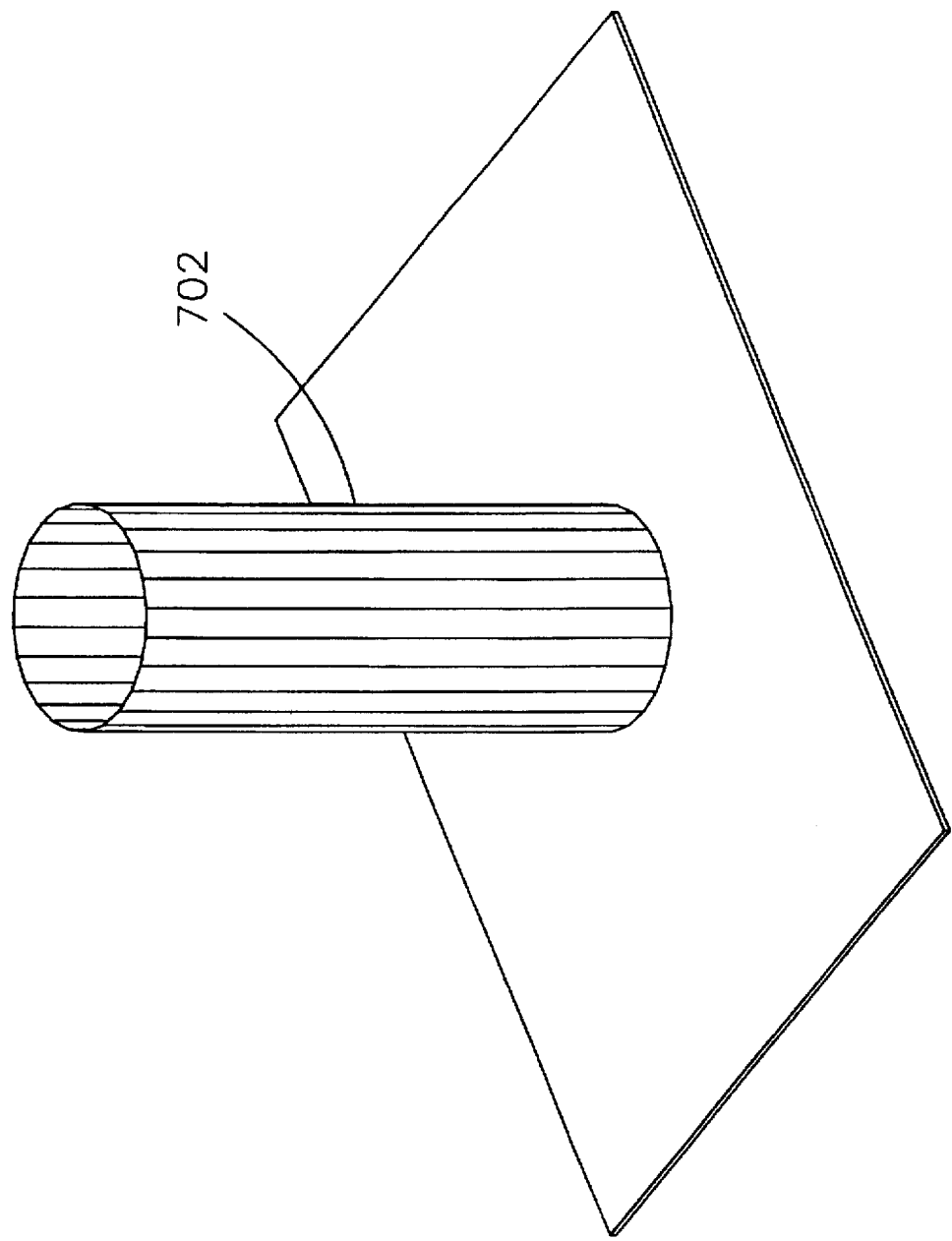
FIG. 7A shows the two dimensional image versus intensity of the hit kernel of FIG. 4A.
Figure 7B:
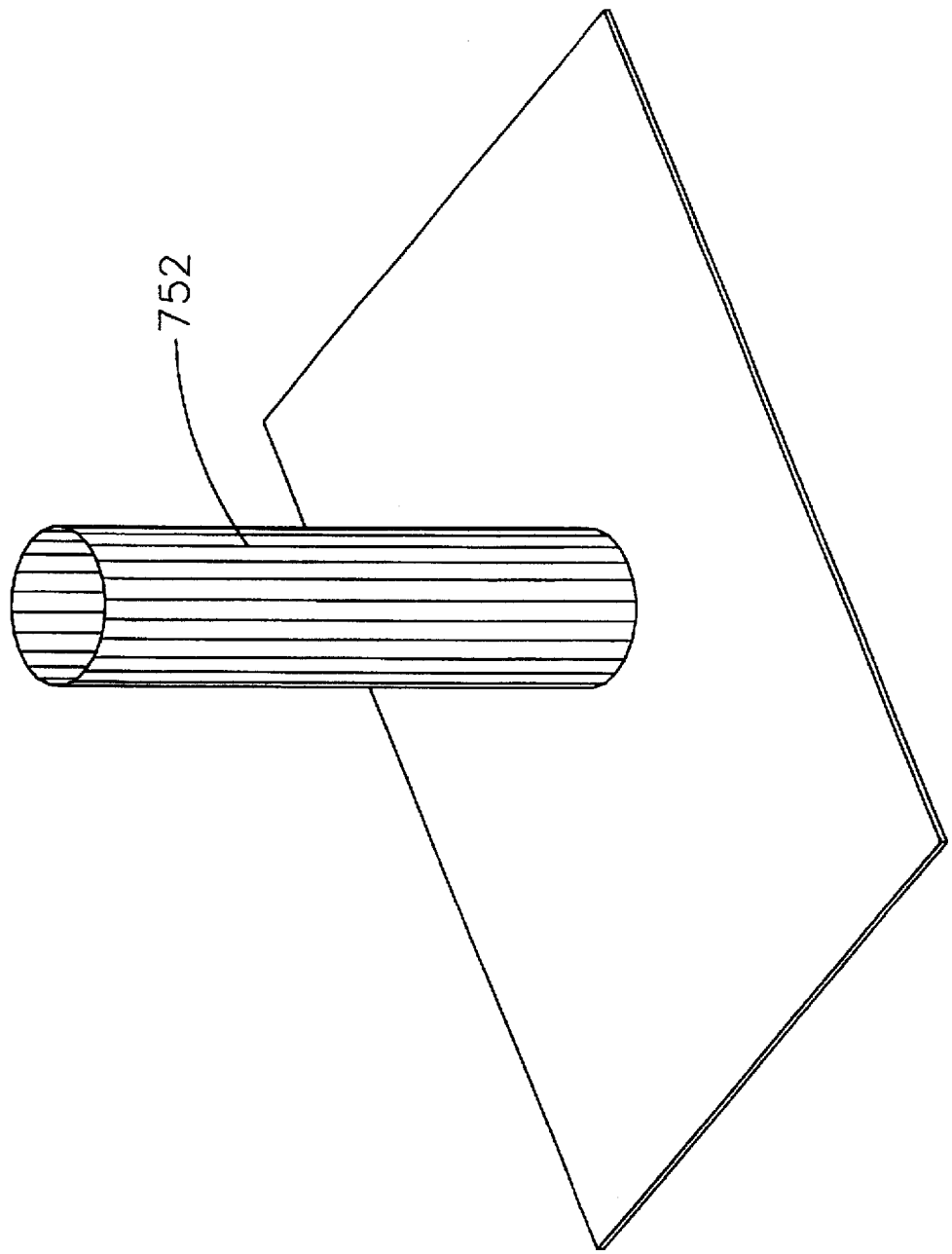
FIG. 7B shows the two dimensional image versus intensity of the miss kernel of FIG. 4B.

The modified "hit", modified "miss", and ANDing steps of FIG. 2 will be discussed in more detail with reference to an example shown in FIGS. 3A and 3B, 4A and 4B, and 5A and 5B, respectively. The x axis in those Figures represents a linear dimension and the y axis represents intensity. FIG. 6 shows the two dimensional images corresponding to FIG. 3A versus intensity (z axis). FIG. 7A shows the two dimensional image versus intensity of the hit kernel of FIG. 4A, and FIG. 7B shows the two dimensional image versus intensity of the miss kernel of FIG. 4B.

Figure 3A:
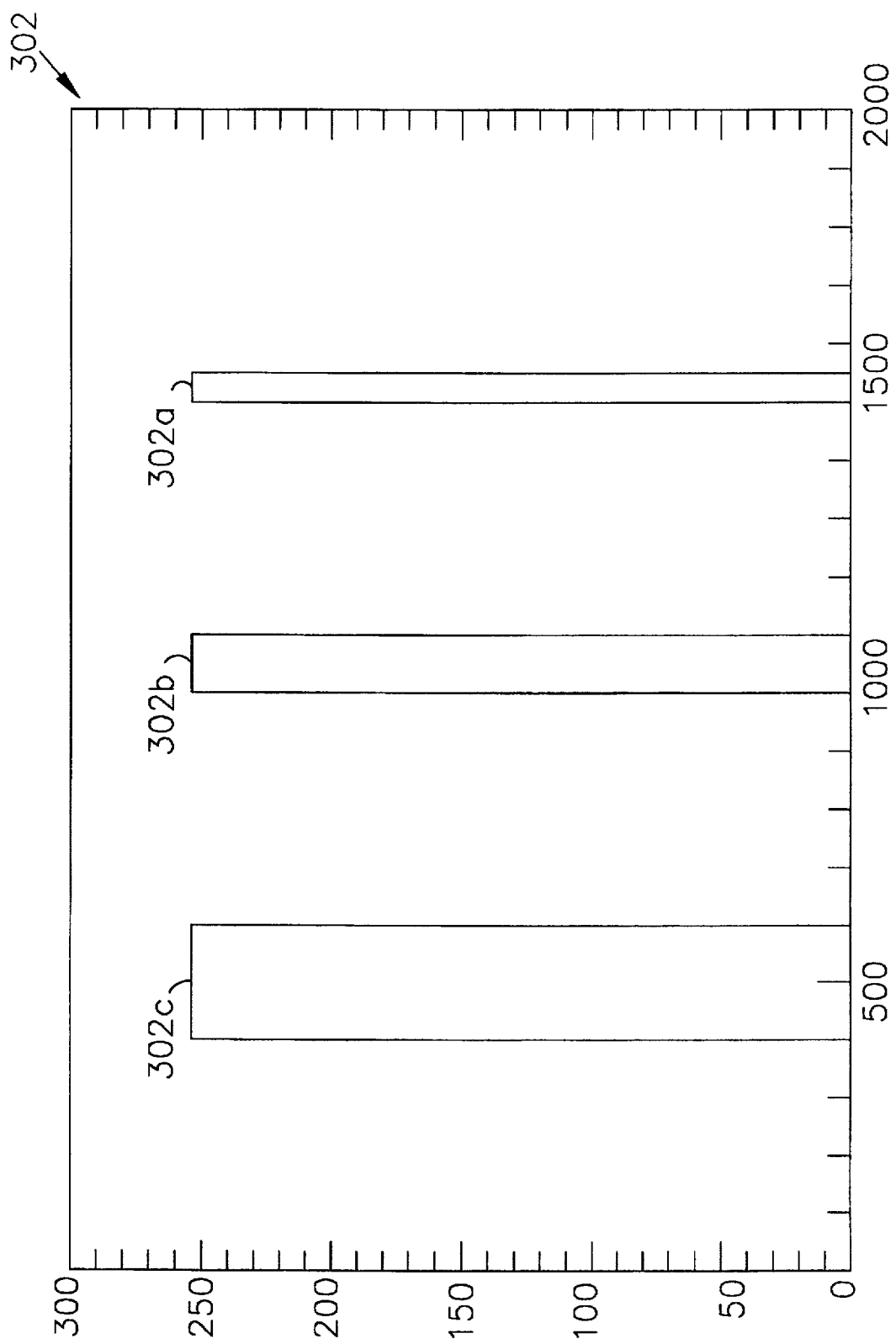
FIG. 3A shows a graph of one dimension of an input scene versus intensity.
Figure 3B:
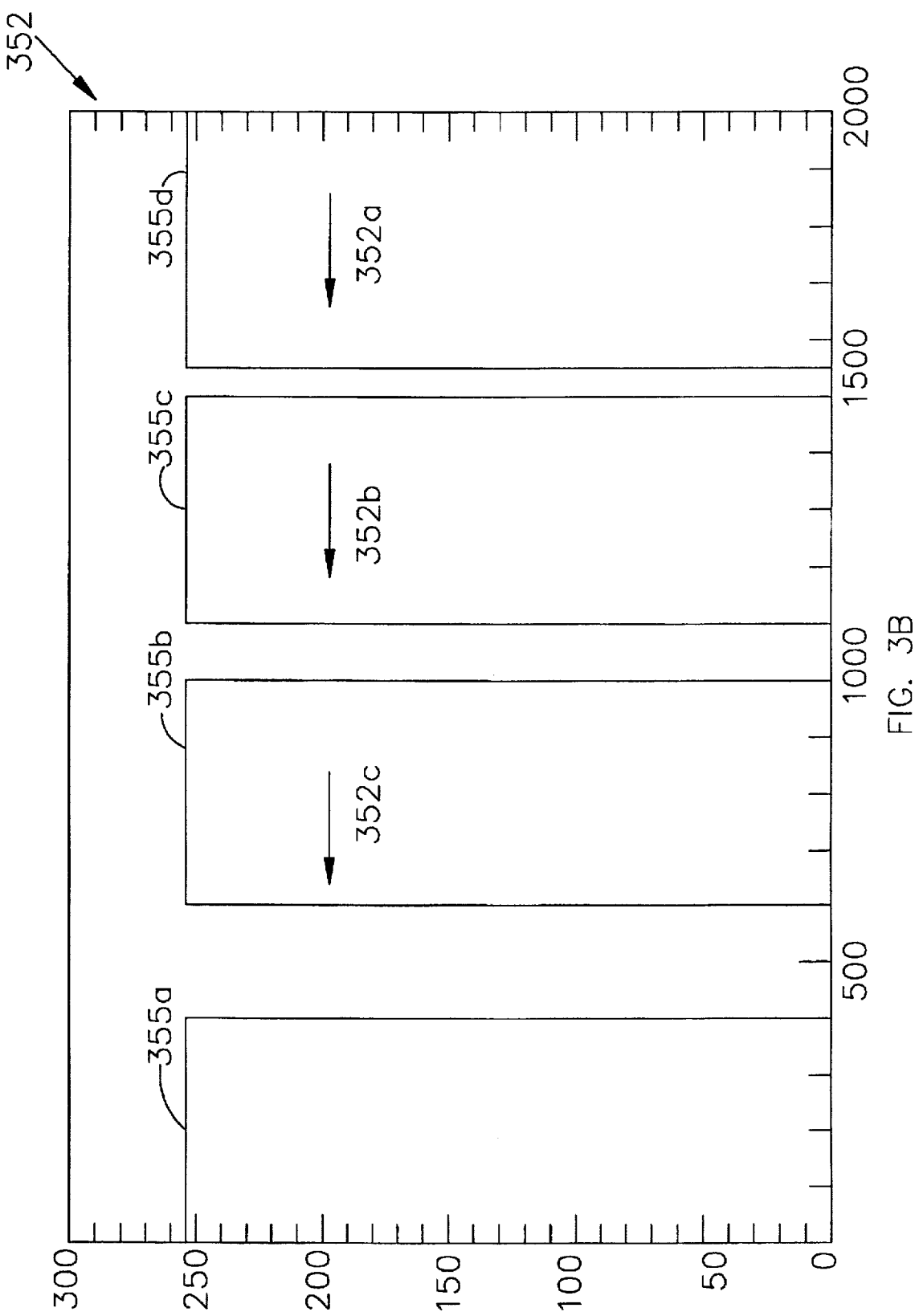
FIG. 3B shows the contrast reverse of the scene from FIG. 3A.

The example of FIG. 3A shows that the image data 302 of FIG. 3A includes a first rectangle 302a, a second rectangle 302b and a third rectangle 302c. Also, for this example, rectangle 302b represents the region of interest (ROI). Each rectangle 302a–c is actually a one dimensional intersection of three two dimensional circles 602a, 602b and 602c, respectively with D1, D2, and D3 representing their respective diameters.

ROI detection unit 113 operates in accordance with steps in FIG. 2 as follows. First, image data 302 is received by ROI detection unit 113 as in step 201 of FIG. 2. The "hit" operation of step 205 involves convolving the image 302 with hit kernel (402 of FIG. 4A) which in this case is approximately less than or equal to the approximate shape of a region of interest, and will be referenced as 402b, which in turn is a cross-section of image 702 of FIG. 7A. A resulting correlation image 502 (FIG. 5A) is then thresholded so that only subimages having intensity equal to or greater than a threshold hit level $T_{hit}$ are retained from correlation image 502. That correlation and threshold comprise the "hit" operation of step 205. In this example, the resulting hit operation yields a hit image 540 which only includes subimages 502b and 502c.

ROI detection unit 113 performs the modified "miss" operation (step 211 of FIG. 2) as follows. First, the complement of image 302 is produced which yields contrast reversed scene (or complement image) 352 of FIG. 3B with rectangles 355a–d and complement subimages 352a–c. The modified "miss" operation involves convolving complement image 352 with the "miss" kernel 452 of FIG. 4B (which is an annulus 452b) whose inner diameter is greater than D2 and is a cross-sectional view of image 752 of FIG. 7B. A resulting correlation image 552 (FIG. 5B) is then thresholded so that only subimages having intensity equal to or greater than a threshold miss level $T_{miss}$ are retained from correlation image 552. That correlation and threshold comprise the modified "miss" operation of step 211. In this example, the resulting miss operation yields a miss image 560 which only includes subimages 552b and 552a.

Figure 2:
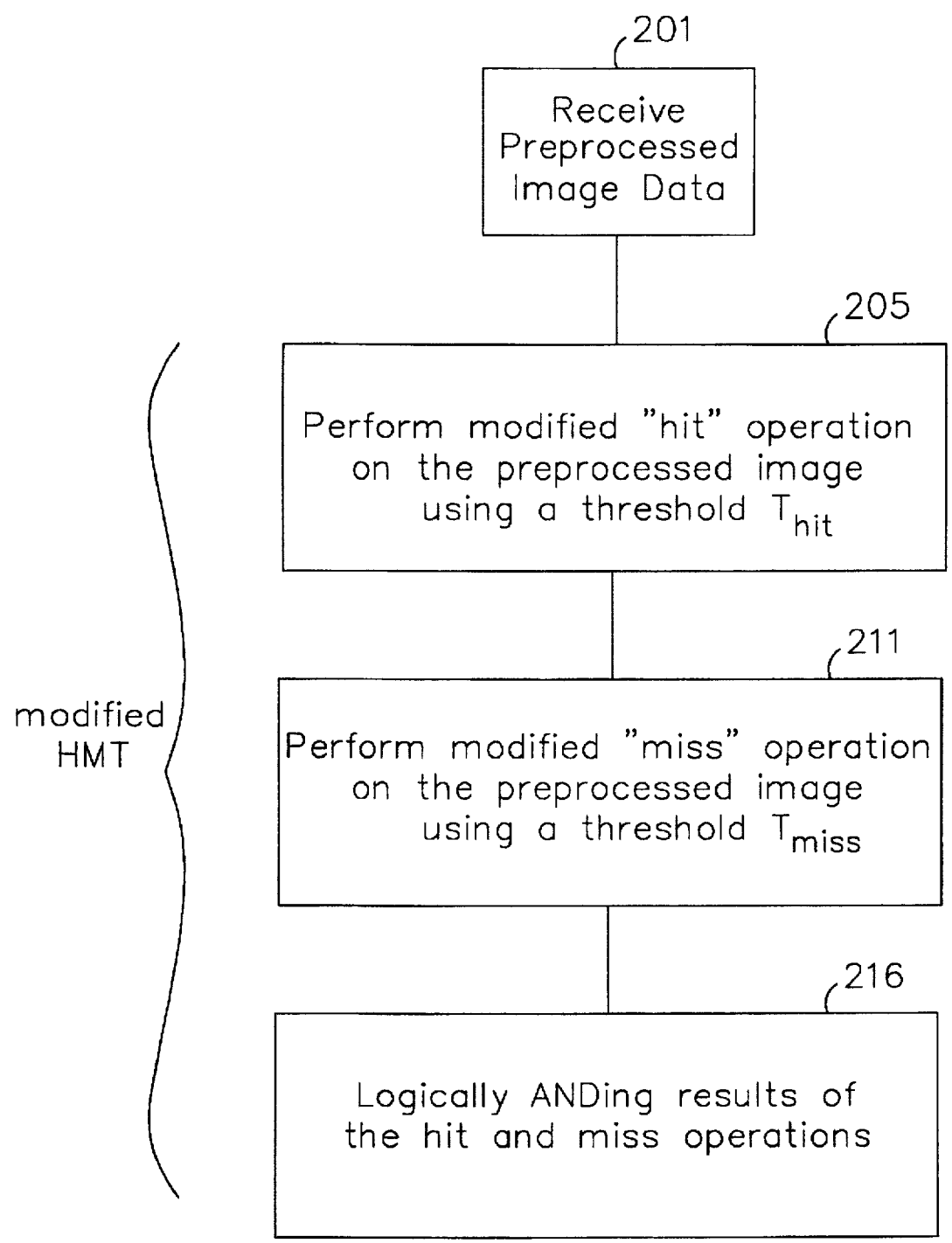
FIG. 2 shows processes performed by the morphological detection system of FIG. 1 and in particular by the ROI detection unit of that system.

To complete the discussion of implementation of the steps in FIG. 2, the final step 216 must be completed. Step 216 simply involves ANDing hit image 540 with miss image 560 to yield subimage 502b (or equivalently 552b) which, as defined above, was the region of interest (ROI) for this example.

The difference between the modified hit/miss transform differs from the classic hit/miss transform as follows.

The classic hit/miss transform can be written symbolically as $$A \odot (H,M) = (A \ominus H) \cap (A^c \ominus M), \quad (1)$$

where A is a binary image, H and M are the hit and miss SE, $\ominus$ denotes erosion, $\cap$ denotes Boolean AND, and $A^c$ denotes the complement of A. Erosion and dilation are defined as follows. Erosion of set A by set B is the set of all points such that set B, translated by x, is contained in set A. Dilation of set A by set B is the set of all displacements "x" such that the displaced relection of set bB and the set A overlap by at least one nonzero element.

It must be noted that the classic HMT is quite sensitive to noise and size-shape perturbations, and it will detect a feature only if the feature exactly matches the shape of the hit and miss structuring elements (SEs). For example, if the ROI is a circle of 15 micrometers, and a circle with a diameter of 15 micrometers is used for the traditional hit and an annulus with inner diameter of 15 micrometers is used for miss operations, then only one shape will lie within the ROI, and that is a circle of 15 micrometers. Shapes such as an ellipse with a 15 micrometer major axis and a 14 micrometer minor axis will not be detected as an ROI.

The solution to this stringent process is to introduce a thresholding process to each step. Erosion can be optically implemented as a correlation of the image with the SE, followed by a threshold. This can be symbolically written as $X \ominus B = T_e(X*B)$, where * stands for correlation and $T_e\{\cdot\}$ is a thresholding function that takes the value 1 of its argument if its argument is greater than e and 0 otherwise. To obtain erosion as defined in morphology, the threshold level e is set to N, where N is the cardinality (e.g. $T_{10}$ (12)=1 and $T_{10}(6)=0$) of B. With these two definitions we write the HMT as $$A \odot (H,M) = T_{hit}(A*H) X \, T_{miss}(A^c*M). \quad (2)$$

The process of FIG. 2 can be optically implemented by first correlating image A with the hit SE, H, and thresholding the result. Next, $A^c$ is correlated with the miss SE, M and thresholded. Finally, the two erosions are multiplied to yield the HMT of A by the SE pair (H,M). It should be understood that throughout this discussion, the SE is also referred to as a kernel as is standard terminology used in reference to a correlation operation.

The above modified HMT, i.e., (2) above and steps 205, 211 and 216 in FIG. 2, has the extremely important advantage over the classical HMT ((1) above) that it is not overly sensitive to deviation in shapes and to noise. Moreover, it allows one the opportunity to vary the threshold levels $T_{hit}$ and $T_{miss}$ and gradually adjust the sensitivity of ROI detection unit 113 to whatever sensitivity is desired. Such adjustments would be based on the detection rate and the false positive rates required as well as the amount of clutter consequently the amount of shape distortion in the images to be processed. For example, the detection can be fixed while the shape distortion is increased by setting lower thresholds and allowing for higher false positives.

The thresholding takes care of the above discussed sensitivity problems by allowing the user to adjust unit 113 so that it considers shapes that are "close" to the 15 micrometer diameter to also be detected as an ROI. This is accomplished by lowering the value of $T_{hit}$ so that shapes other than the perfect circle with 15 micrometer diameter might not be excluded from the ANDing step. The lower the value of $T_{hit}$ the more the shapes can deviate from the specific shape of the hit SE and not be excluded from the ANDing step (step 216). The same holds for lowering the value of $T_{miss}$ so that shapes other than the specific shape of the miss SE (e.g. a perfect circle with 15 micrometer diameter) are not necessarily excluded from the ANDing step. The values of $T_{hit}$ and $T_{miss}$ can be determined empirically by inputting specific sized shapes as input to ROI detection unit 113, and then reduce the values of $T_{hit}$ and $T_{miss}$ until ROI detection unit 113 detects those specific sized shapes by indicating those shapes as ROIs.

In addition to varying the threshold values, ranges of other shapes can also be detected by appropriate selection of SEs of the same shape but too different sizes for step 205 (modified hit) and step 211 (modified miss). For example, suppose it is desirable to include all circles with diameters between 15 and 20 micrometers. Then, the SE for the hit operation should be a circle with a diameter of 15 micrometers, which means any circle (perfect) with a diameter of 15 micrometers or more would be produced in the hit operation (even without implementing the thresholding process). The SE for the miss operation should be an annulus with an inner diameter of 20 micrometers, which means that any circle with a diameter of 20 micrometers or less would be produced in the miss operation (again without implementing the thresholding process). The result is that ROI detection unit 113 would indicate or detect any circle with a diameter between 15 micrometers to 20 micrometers as an ROI.

This above example can be taken one step further by considering situations (such as Pap-smear detection as discussed below) where it is desirable to not only detect circles between two diameters, but also to detect non-circular shapes (e.g., elliptical) that are approximately between the hit SE (small circle) and the miss SE (large circle). This is achieved by varying the threshold values $T_{hit}$ and $T_{miss}$. Again, the lower the threshold values, the greater the possible deviation that objects can have and still lie within the hit operation and the miss operation.

Another variation that can be made is in the selection of the shape of the SE. This shape for the above examples has been a circle. Typically, however, the shape of the SE for the hit operation as well as the SE for the miss operation should be chosen to be similar to the shape of objects to be detected by ROI detection unit 113 which in turn depends on the application in question. For example, for Pap-smear detections, SEs were circles (deviations from circular shapes were also achieved by including hit and miss thresholds). Suppose, however, that system 100 (FIG. 1) is receiving radar images, passive infrared images, laser radar images, visual images or any other source of images taken from higher elevations, and the desired ROIs are of a certain truck. Then the shape of the SEs should be that of that truck.

Combining all of the above, selection of the threshold values, the hit SE and the miss SE depends on all the circumstances. If the images contain a large number of vehicles that are approximately the same size as the truck, then the SE should include distinguishing features of that particular truck, and the images must have enough resolution to include at least some of those distinguishing features. Also, if the images are relatively clear, the threshold levels $T_{hit}$ and $T_{miss}$ can be set relatively high. However, if the images are of lower resolution, or have reduced resolution due to weather, background clutter, or other external reasons, or if the resolution capability of the imaging device are not sufficiently high, it might well be necessary to lower the $T_{hit}$ and $T_{miss}$ and trade some false alarm for the required detection.

Figure 8A:
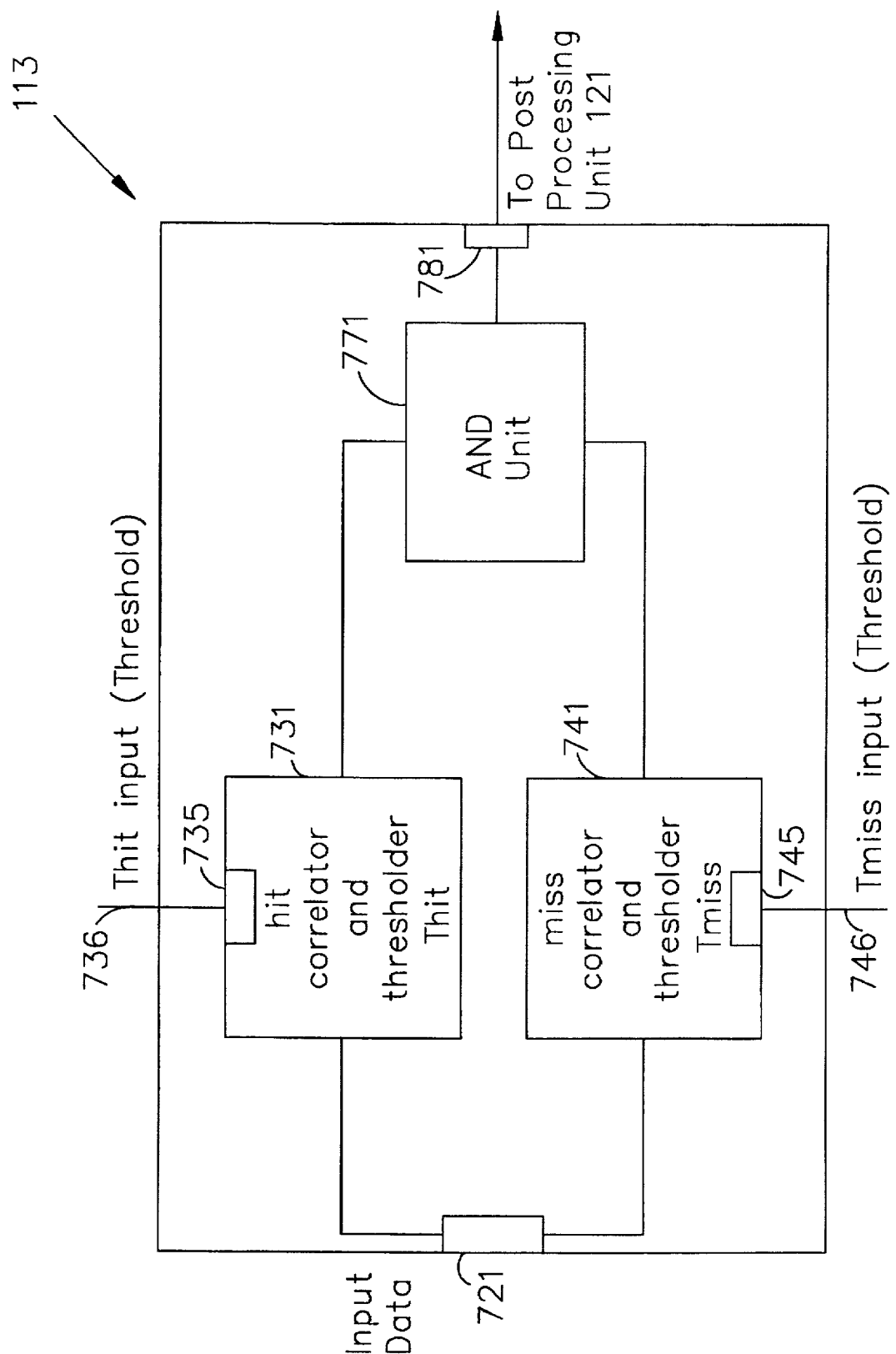
FIG. 8A shows a region of interest detection unit according to an embodiment of the invention.

FIG. 8A shows ROI detection unit which implements the steps of FIG. 2. Recall that ROI detection unit 113 can be entirely electronic, entirely optical or some hybrid thereof. Referring to FIG. 8A, input data such as images are received at input 721 which is then forwarded to hit correlator and thresholder unit 731 which has a threshold adjustment element 735 for adjusting $T_{hit}$. Threshold value $T_{hit}$ can be adjusted from within unit 731 or externally via $T_{hit}$ input 736. The input data is also forwarded to miss correlator and thresholder unit 741 which has a threshold adjustment element 745 for adjusting $T_{miss}$. Threshold value $T_{miss}$ can be adjusted from within unit 741 or externally via $T_{miss}$ input 746.

Units 731 and 741 then output the resulting hit and thresholded data output and the resulting miss and thresholded data, respectively to ANDing unit 771 which logically ANDs that data and outputs resulting ANDed data at output 781, wherein that resulting data represents the region of interest detected data. The region of interest detected data might require additional processing by post-processing unit (121 of FIG. 1).

Figure 8B:
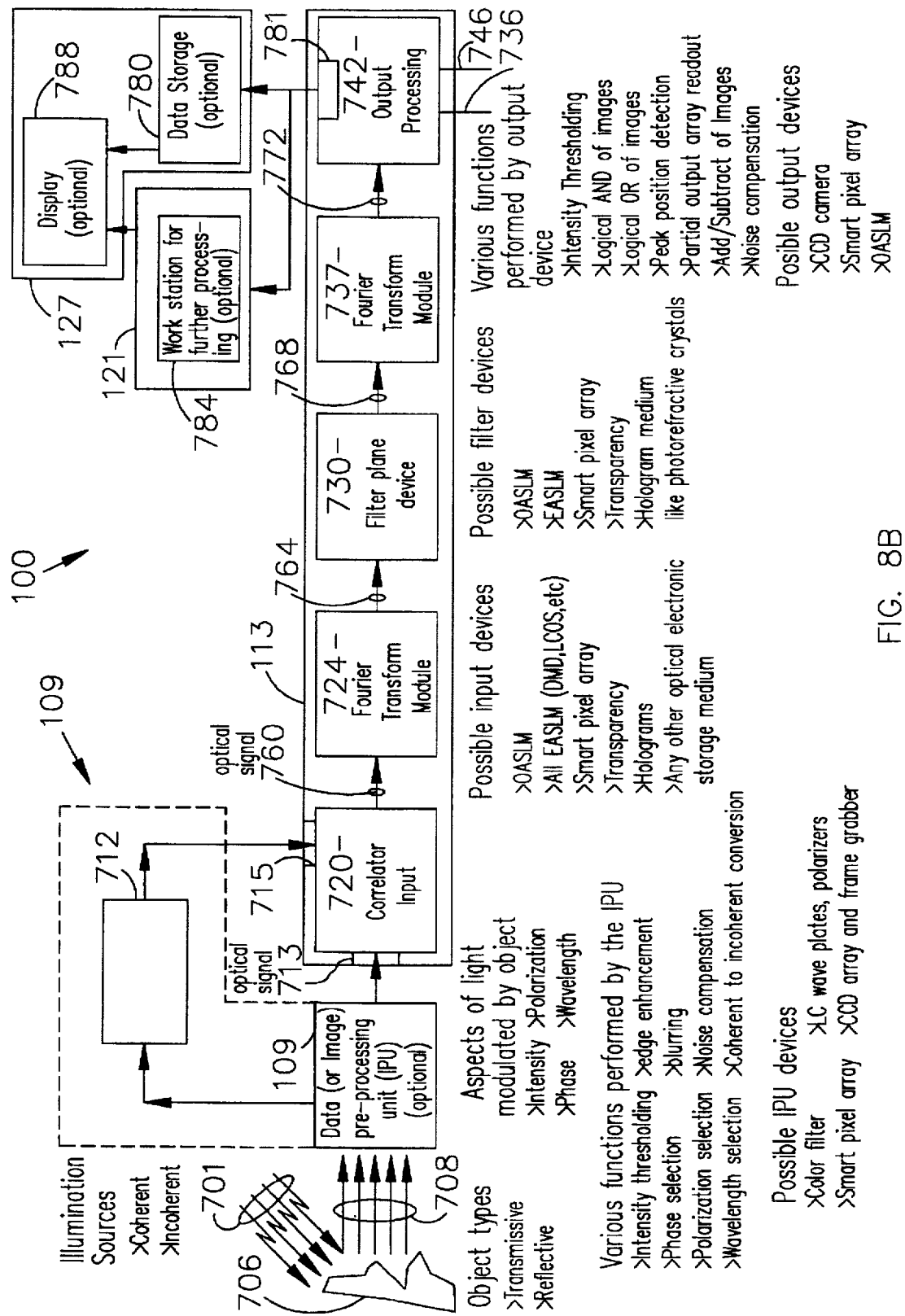
FIG. 8B shows a more detailed implementation of the system of FIG. 1 (without data acquisition unit), and in particular, of the ROI detection unit.

FIG. 8B shows more detailed implementation of system 100 (without data acquisition unit 105), and in particular, of ROI detection unit 113. Optical radiation 701 is either transmitted through object 706. Radiation 701 is modulated by object 706 and this modulation can be intensity modulation, phase modulation, polarization modulation or wavelength modulation. The return radiation 708 is received by data (or image) preprocessing unit 109. Data preprocessing unit 109 can perform a variety of functions on return radiation 708 including intensity thresholding, phase selection, polarization, or wavelength selection depending on whether the type of modulation being detected is intensity, phase, polarization, or wavelength, respectively. Data preprocessing unit 109 can also perform edge enhancement, blurring, noise compensation and/or coherent to incoherent conversion (if radiation 708 is incoherent) on the radiation. Data preprocessing unit can be a color filter, a smart pixel array (see discussion below), a collection of liquid crystal waveplates with polarizers (see below), or a CCD array. If data processor 109 is a CCD array, then a unit 109 further requires a computer and frame grabber 712 which receives electrical signals output from the CCD array, performs the above discussed functions in a manner standard in the art of digital image processing. ROI detection unit 113 receives the preprocessed radiation at optical input 713 which is ready to perform steps 205 and 211 of FIG. 2. If data preprocessing unit 109 comprises a CCD array with frame grabber 712, then the resulting electrical data is input to ROI unit 113 at electrical input 715.

ROI unit 113 includes a correlator input 720, a Fourier Transform module 724, a filter plane device 730, another Fourier Transform module 736 and output processing unit 742. Correlator 720 receives the preprocessed radiation (or electrical signals) and places that data on an optical beam using correlator input 720. Correlator input 720 can be a smart pixel array (discussed below), an optically addressable spatial light modulator (OASLM), EASLM or electronically addressable spatial light modulator including but not limited to a deformable mirror display (DMD) or an liquid crystal on silicon device (LCOS). Other types of correlator inputs can include a transparency, a hologram, and any other optical storage medium. An alternative example of a correlator input is any electronic storage medium.

Assuming that correlator input 720 functions in the optical domain according to a preferred embodiment of the invention, input 720 then outputs radiation 760 with input data thereon (by intensity, phase, polarization, or wavelength as discussed above) to Fourier transform module 724 which performs a Fourier transform of that input data. Fourier transform module 724 can simply be a single lens or a lens combination. Filter plane device 730 receives the Fourier transformed optical data 764 output from module 724 and that optical signal is then multiplied by an appropriate hit or miss kernel depending on which step 205 or 211 is being performed. Filter plane device 730 can be an OASLM, an EASLM, a smart pixel array, a transparency and a hologram medium like photorefractive crystals. A smart pixel array has light incident on it and this ligh is modified at each pixel based on the "intelligence" circuit at that pixel. The output can be be optical or electrical signals.

Fourier transform module 737 receives the multiplied data 768 and Fourier transforms that data. Again, module 737 can be as simple as a single lens, or can be a group of lenses. Module 736 then outputs the Fourier transformed, multiplied data 772 to an output processing device 742 which can perform intensity thresholding functions of steps 205 and 211 as well as the ANDing step 216 of FIG. 2. Device 742 can also perform logical ORing, peak position detection, partial output array readout, adding and/or subtracting images and noise compensation. Output processing device 742 can include a CCD camera, the smart pixel array, and/or an OASLM and transforms the optical data to digital data before outputting that data to post processing unit 121 (see FIG. 1 as well). Output processing unit 742 then outputs the result of the process steps 205, 211, and 216 (from FIG. 2) to post-processing unit 121 and/or to display/storage device 127 from output 781 (also see FIG. 8A). Unit 121 can include a work station 784 which can further process the data. ROI detection can include various types of processing performed in a work station such as texture detection, obtain statistics across the image—such as maximum value, minimum value, mean, variance, skew or kutosis, evaluate fractal dimensions, perform segmentation of the feature of interest to measure features such as perimenter-to-area ratio or calculate nucleus-to-cytoplasm ratio in Pap-smears. Display/storage device 127 can include a data storage unit 780 and a display device 788.

Particular embodiments of ROI detection unit 113 of FIGS. 1, 8A, and 8B which implement the steps of FIG. 2 will now be presented.

Figure 9A:
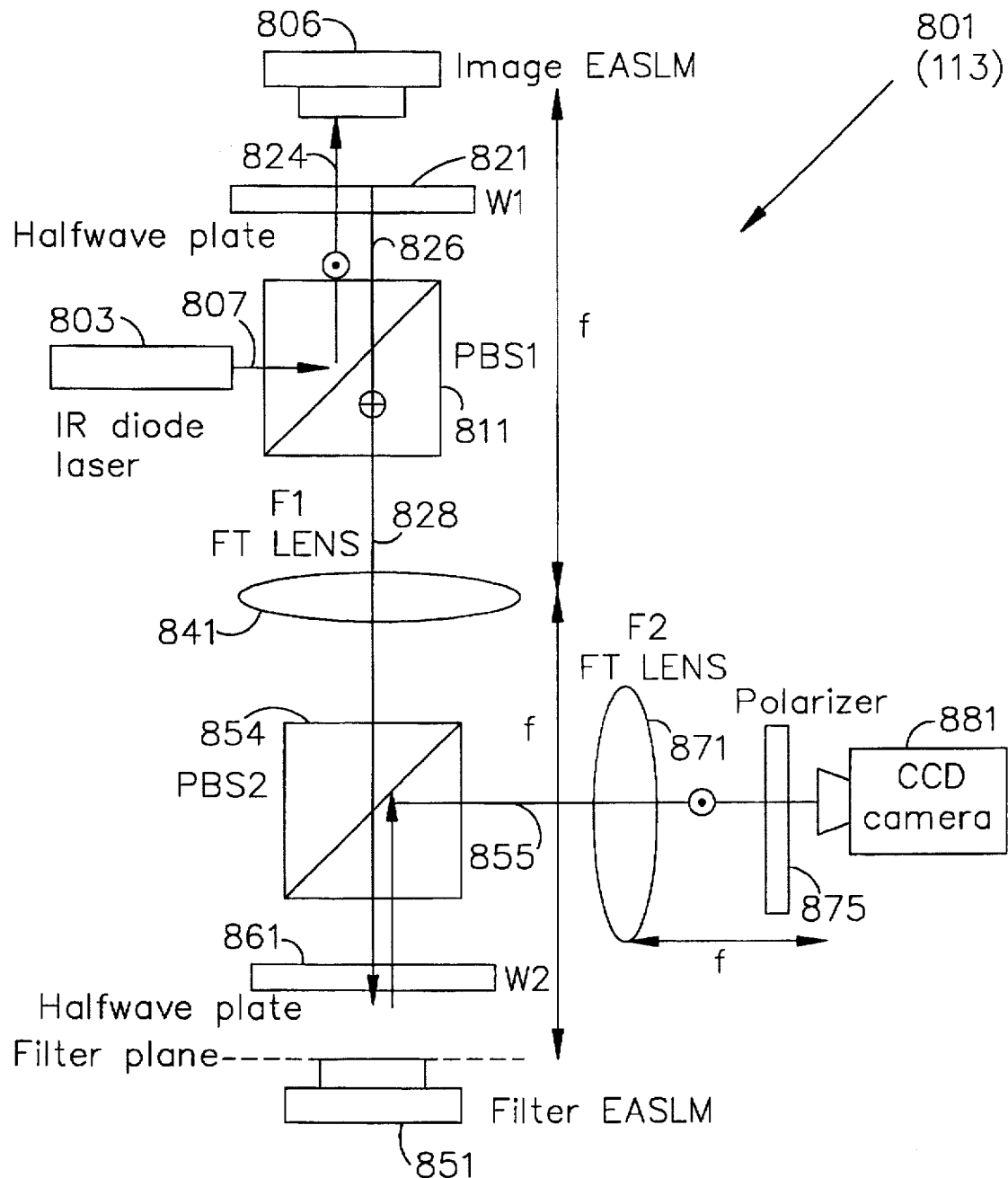
FIG. 9A shows an optoelectronic processor according to one embodiment of the invention which can perform the steps of FIG. 2.

FIG. 9A shows an optoelectronic processor 801 according to one embodiment of the invention which can perform the steps of FIG. 2. An illumination source 803 is a vertically polarized collimated infra-red laser (807 nm wavelength here but any wavelength optical source may be used as will be discussed below). Source 803 outputs beam 807 towards a polarization beamsplitter PBS1 811 which reflects vertically polarized beam 807 towards half wave plate 821. The portion of beam 807 that passes through plate 821 will be referred to as beam 824. Beam 824 illuminates electronically addressable spatial light modulator (EASLM) 806 which has the image addressed thereon. One such spatial light modulator is 256×256 modulator as discussed by D. McKnight, K. Johnson et al. "256×256 liquid-crystal-on-silicon spatial light modulator" Applied Optics, Vol 33(14), pp 2775–2784 (1994) the contents of which are incorporated herein by reference. To obtain the hit convolution, modulator 806 is illuminated by beam 824 while the image is addressed thereon. Pixels on modulator 806 which are switched ON, change the polarization state of beam 826 from vertical to horizontal when beam 824 is reflected off those pixels and passed back through half waveplate 821. Pixels on modulator 806 which are switched OFF do not change the polarization state of beam 824. Beam splitter 811 then only allows horizontally polarized portions of beam 826 to pass as beam 828 to lens 841 having focal length F1 to the filter plane. Lens 841 serves to Fourier transform the image on modulator 806 into a Fourier transformed image which appears at the filter plane, where in turn a second electronically addressable spatial light modulator 851 is situated. Since light from beam 828 was horizontally polarized, it passed through polarization beam splitter 854 and second halfwave plate 861 to reach the filter plane. The Fourier transformed data incident on modulator 851 is then multiplied by the binary phase only (BPO) representation of a hit kernel (such as 402 of FIG. 4A which is alternatively referred to as the hit structuring element (SE)) which is addressed on modulator 851. Beam splitter 854 then reflects only the vertically polarized light 855 which was passed through half waveplate 861. Vertically polarized light 855 then passes through a lens 871 and a polarizer 875 to a CCD camera 881. With this arrangement, the combined image at the filter plane (EASLM 851) was again Fourier transformed by lens 871 having focal length F2. This yields a hit correlation image (502 in FIG. 5A showed one example of such an image) which is captured by CCD camera 881. The correlation is acquired by the CCD 881 as a grey level image which in turn, is transferred to a work station in which it is thesholded. Polarizer 875 serves to help reduce backscatter. Halfwave plates 821 and 861 are half waveplates used to align the linear polarized light along the bisector of the two switched states of the liquid crystal in spatial light modulators 806 and 851. Half waveplate 821 is used to align the input linear polarization along one of the two switched states of the liquid crysal in the SLM. The input SLM (EASLM 806) works in amplitude mode. Half waveplate 861 is used to align the polarization along the bisector of the liquid crystal of the filter SLM (EASLM 851) which works on phase mode. Half waveplates 821 and 861 can be passive or active, and can be used to get the complement of the input image without writing the inverse image onto the image SLM (EASLM 806).

Up to this point, system 801 (one example of an ROI detection unit 113) has only performed the modified "hit" operation (step 205 of FIG. 2) corresponding to FIGS. 3A, 4A and 5A. In order to perform the modified "miss" operation (step 211 of FIG. 2), a contrast reversed image (corresponding to image 352 in FIG. 3B) is produced at modulator 806 by switching pixels thereon from logical 1 to logical 0 and vice versa, and a miss correlation kernel (corresponding to image 452 of FIG. 4B) at modulator 851 to yield the miss correlation image (corresponding to image 552 of FIG. 5B). Once the threshold operation is performed, the resulting thresholded miss correlation image is ANDed electronically with the thresholded hit correlation image (step 216 of FIG. 2) to yield the ROI image. It must be noted that the above discussion involving the use of the complement of the image for the modified miss operation can be alternatively performed by using the same input image as was used for the modified hit operation. In that case, the output will be a less-than-or-equal-to threshold operation as opposed to the greater-than-or-equal-to used earlier. These two approaches to thresholding may be incorporated on the output smart pixel array.

Source 803 can be any type of light source collimated or not collimated such as a laser, a diode, or a white light source. Electronically addressable spatial light modulators 821 along with lenses 841 and 871 and beam splitters 811 and 854 can be any combination of devices capable of imposing an image on a light beam and/or performing the correlation of the image with hit and miss kernels. The preferred embodiment takes advantage of high speed processing possible by performing two dimensional correlations without requiring that the two dimensional images first be transformed into one dimensional arrays before performing the correlation. Hence, the preferred embodiment involves the use of any combination of optical devices that can achieve such two dimensional correlations. Refer to FIG. 8B for examples of devices that can be used for ROI detection unit.

Figure 9B:
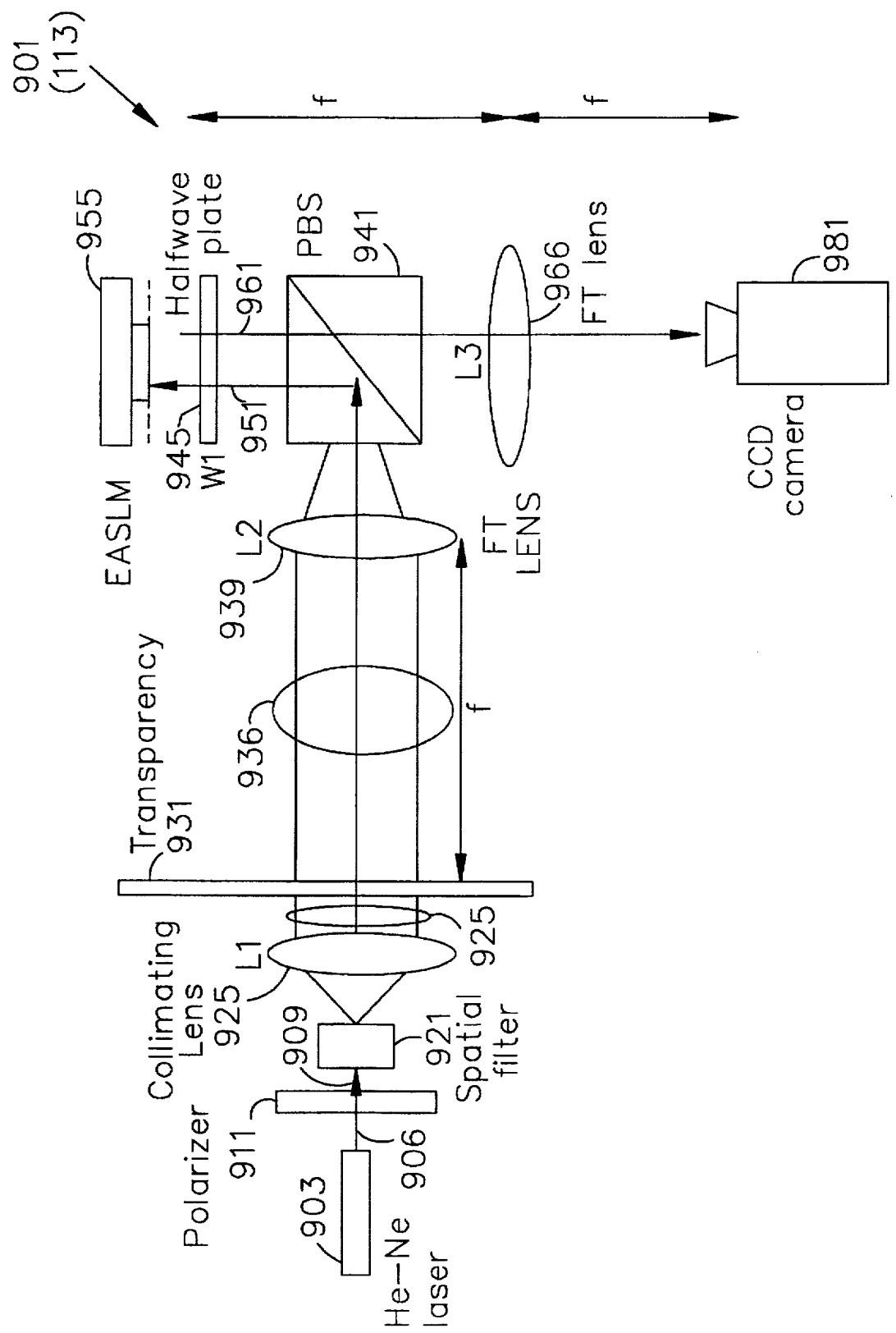
FIG. 9B shows an ROI detection unit which is also an electrooptic version according to another embodiment of the invention.

FIG. 9B shows an ROI detection unit 901 which is also an electrooptic version according to another embodiment of the invention. Here, a laser 903 outputs a beam 906 that passes through a polarizer 911 to yield polarized light 909 which in turn passes through spatial filter 921 to a lens 925 to yield collimated beam 925. Beam 925 then passes through a transparency 931 to yield image beam 936 which has contained thereon an image to be analyzed for ROIs. Beam 936 then passes through lens 939 to polarizer beam splitter 941 which reflects a portion of beam 936 as beam 951 which in turn is transmitted through half-wave plate 945 to electrically addressable spatial light modulator 955 at a filter plane of unit 901 which functions in a manner similar to EASLM 851 at the filter plane of system 801 in FIG. 9A. The reflected beam 961 then passes through splitter 941 towards lens 966 and is in turn detected by CCD camera 981.

ROI detection unit 901 uses a laser 903 but any light source may be used. Similarly, unit 901 utilizes a transparency 931 to input image data, but any medium can be used including film, glass slides and so forth. As with detection unit 801, detection unit 901 includes an EASLM 955 to input the hit and miss SEs and perform the correlations in the hit and miss operation of FIG. 2. Two transparencies can serve as the hit and miss filters and the input EASLM. This exploits the advantage that the modified HMT needsonly two filters to detect a range of shapes as opposed to a large template of filters required by the traditional optical matched filter approach. Each of transparency 931 and EASLM 955 can also be replaced with a volume hologram polymer, photo-refractive crystals or other two dimensional image and filter storing media.

Figure 10A:
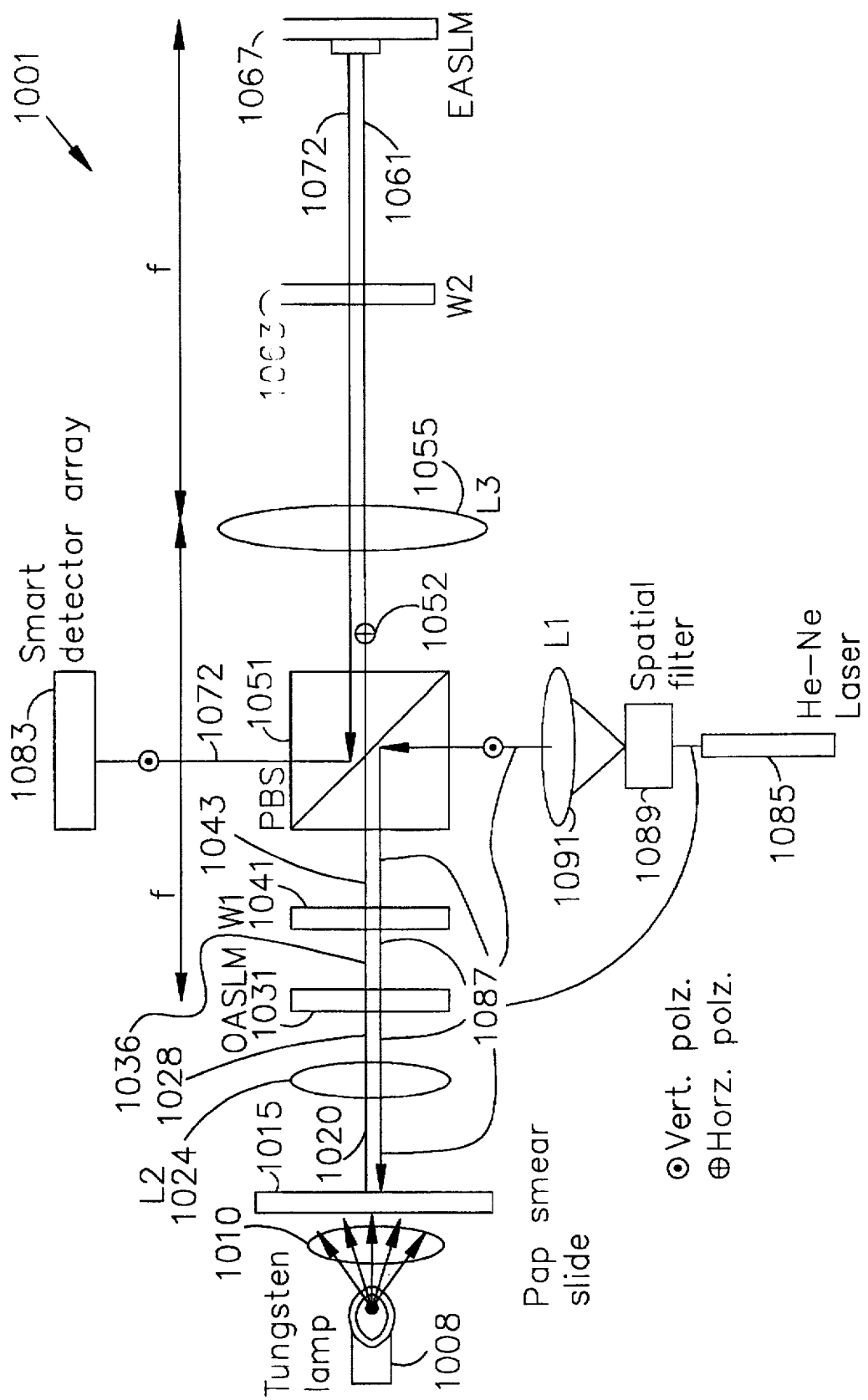
FIG. 10A shows a preferred embodiment of an ROI detection unit which is nearly completely optical and which avoids bottlenecks that may occur when a CCD camera is used to capture images.

FIG. 10A shows a preferred embodiment of an ROI detection unit 1001 which is nearly completely optical and avoids bottlenecks that may occur in the systems 801 and 901 when a CCD camera is used to capture images. System 1001 utilizes a Vander-Lugt correlator and includes a tungsten lamp 1008 that outputs radiation 1010 to a slide (such as a Pap-smear slide) 1015. Radiation 1020 represents that portion of radiation that passes through slide 1015 to lens 1024 (which can be a microscope objective), which yields radiation 1028 which in turn passes through an optically addressable spatial light modulator (OASLM) 1031. Radiation 1028 has the input information or data written thereon after it passed through slide 1015. OASLM 1031 itself thresholds the image to obtain a binary image on beam 1036 which passes through a ferroelectric liquid crystal (FLC) 1041 which is a switchable half waveplate used to obtain a contrast reversed image on beam 1043 which in turn will be used to perform the modified miss operation (step 211 of FIG. 2). Prior to that, however, beam 1043 passes due to its polarization, through polarization beam splitter 1051 to yield beam 1052. Beam 1052 then passes through lens 1055 which serves as a Fourier transforming lens and then through halfwave plate 1063 to yield beam 1061 which in turn travels to an electrically addressable spatial light modulator EASLM 1067 which is placed at the filter plane. Halfwave plate 1063 is used to align the polarization of linear polarized light beam 1061 along the bisector of the two switched states of FLC 1041. Reflected beam 1072 has the polarization of light at ON pixels of EASLM 1067 rotated 90 degrees, thereby causing that radiation to be reflected at polarization beam splitter (PBS) 1051, and is then received at a smart detector array 1083. Smart detector array 1083 is a VLSI device used to threshold and AND the results of steps 205 and 211. Smart detector array is described in "CMOS Photodetectors for correlator peak location" by R. M. Turner and K. M. Johnson, IEEE Photonics technology Letters, Vol 6(4), 1994, the contents of which are incorporated herein by reference. Laser 1085 outputs vertically polarized radiation 1087 to spatial filter 1089 followed by lens 1091 and then PBS 1051 reflects beam 1087 back through FLC 1041, then OASLM 1031, then lens 1024 and finally to slide 1015.

Unit 1001 operates as follows. Initially, the image on OASLM 1031 is read with collimated vertically polarized laser beam 1087 while the optical axis of FLC is vertical. That image is transmitted by PBS 1051, Fourier transformed by lens 1055 and multiplied by the hit filter in binary phase only (BPO) representation on EASLM 1067. The reflected light (beam 1072) from EASLM 1067 is Fourier transformed by lens 1055 and the vertically polarized light is reflected to smart detector array 1083 which thresholds the image to obtain the hit erosion. To obtain the image complement, the optic axis of FLC 1041 is electrically rotated by 45 degrees. The corresponding miss BPO filter (the miss kernel) is then written to EASLM 1067 to obtain the miss correlation at the detector plane (which is the plane of smart detector array 1083). Smart detector array 1083 thresholds the result to obtain the miss erosion (step 211) and then ANDs the two thresholded images to get the output of ROI detection unit 113.

Figure 10B:
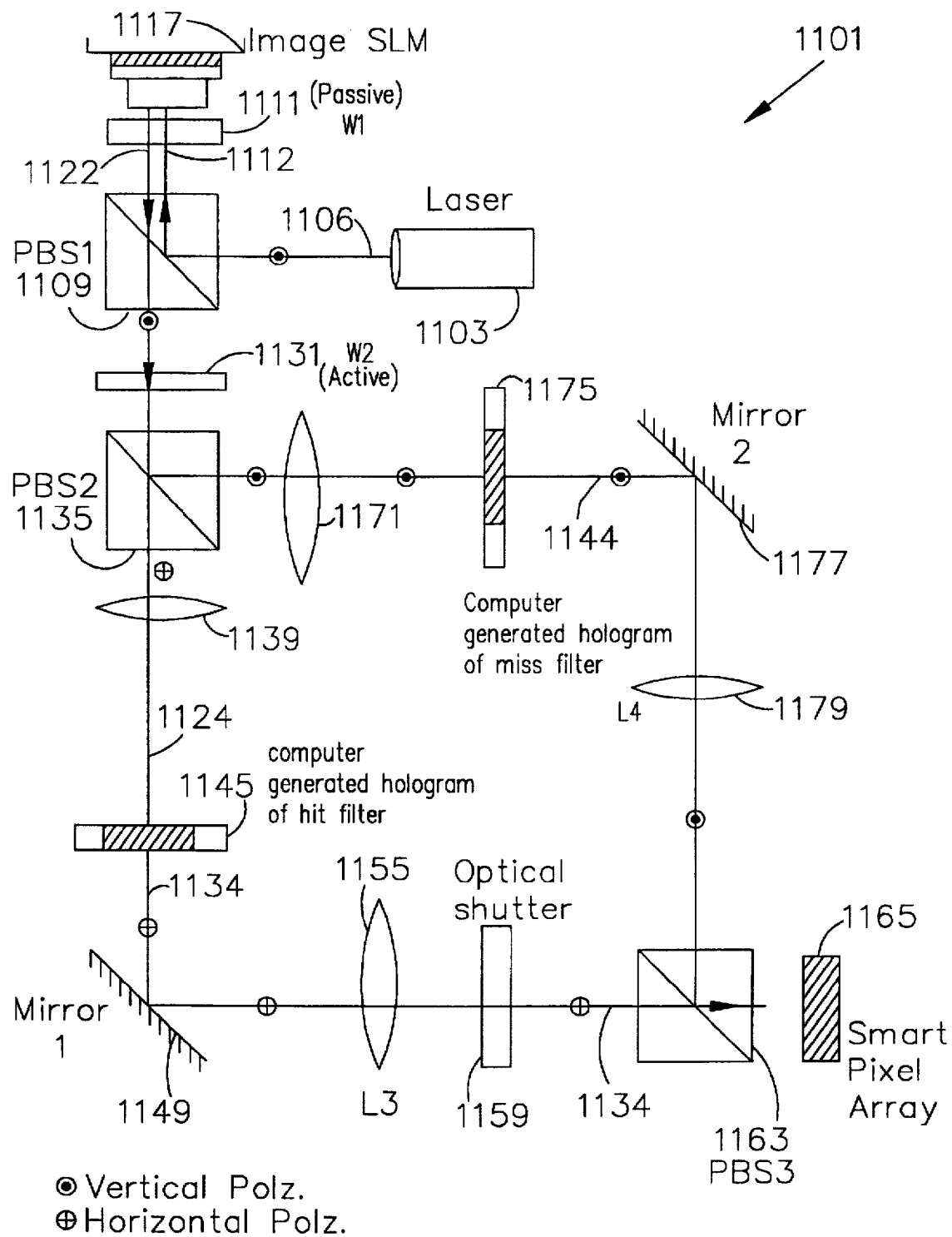
FIG. 10B shows another embodiment of such an ROI detection unit.

FIG. 10B shows an ROI detection unit 1101 having a laser 1103 which outputs vertically polarized radiation 1106 which arrives at polarization beam splitter (PBS) 1109. Radiation 1106 is reflected by PBS 1109 as radiation 1112 which passes through waveplate 1111 to image spatial light modulator (SLM) 1117 which has the image in question stored thereon. SLM can be any one of the above discussed spatial light modulators. Radiation 1112 is reflected from 1117 and passes through waveplate 1111 which causes it to be horizontally polarized and accordingly passes through PBS 1109 to active waveplate 1131. Radiation 1122 passes through active waveplate 1131 as radiation 1124 and either remains horizontally polarized or is switched to vertically polarized by waveplate 1131. If radiation 1124 remains horizontally polarized, it passes through polarization beam splitter (PBS) 1135 and lens 1139 to a computer generated hologram 1145 which serves as a hit filter. After passing through hologram 1145, radiation 1134 is reflected by mirror 1149 towards lens 1155 to optical shutter 1159. If optical shutter is open, radiation 1134 pass through polarization beam splitter 1163 to a smart pixel array 1165 which can read and store the two dimensional data on beam 1134.

Back to active waveplate 1131, if the polarization of radiation 1122 is changed from horizontal to vertical, radiation 1124 is reflected by PBS 1135 and passes through lens 1171 to a computer generated hologram miss filter 1175 and passes through it to yield radiation 1144. Radiation 1144 is reflected by mirror 1177 to lens 1179, is reflected by PBS 1163 to smart pixel array 1165. The steps of FIG. 2 are accomplished by switching active waveplate 1131 from one state that allows horizontally polarized radiation 1122 to pass with no polarization change or that changes polarization of radiation 1122 to vertical. When waveplate 1131 passes horizontally polarized radiation 1124, ROI detection unit 1101 performs the modified hit step (step 205 of FIG. 2). When waveplate 1131 changes the polarization of radiation 1124 to vertical, ROI detection unit 1101 performs the modified miss step (step 211 of FIG. 2). Thresholding for both cases is achieved at smart pixel array 1165.

ROI Detection in Cervical Smears

As discussed in the background section, pap smears are slides of cellular material used to screen for cervical cancer. Automated Pap-smear is desirable as a quality control mechanism for detecting abnormal slides missed by human inspection. Such automated screening, however, is difficult because each slide can have 100,000 cells, and 90% of all slides examined are normal. In the slides that are abnormal, 100 cells may show signs of abnormality. If 100 slides are processed, 100×100,000 cells are examined and 10×100 of these cells are abnormal which means $1000/10^7=1$ in 10,000 cells are abnormal. Consequently, on any one slide the number of abnormal cells per 10,000 normal cells may be as low as one. Each slide is typically 2.5 cm by 5.0 cm of inspection area. Features of interest (the cell nuclei) average 10 micrometers in diameter. Sampling the feature at 0.8 micrometers/pixel (equivalent to screening the slide with a 20× objective) requires approximately 30,000 images of 256×256 pixels to be processed for each Pap-smear screened.

Figure 11A:
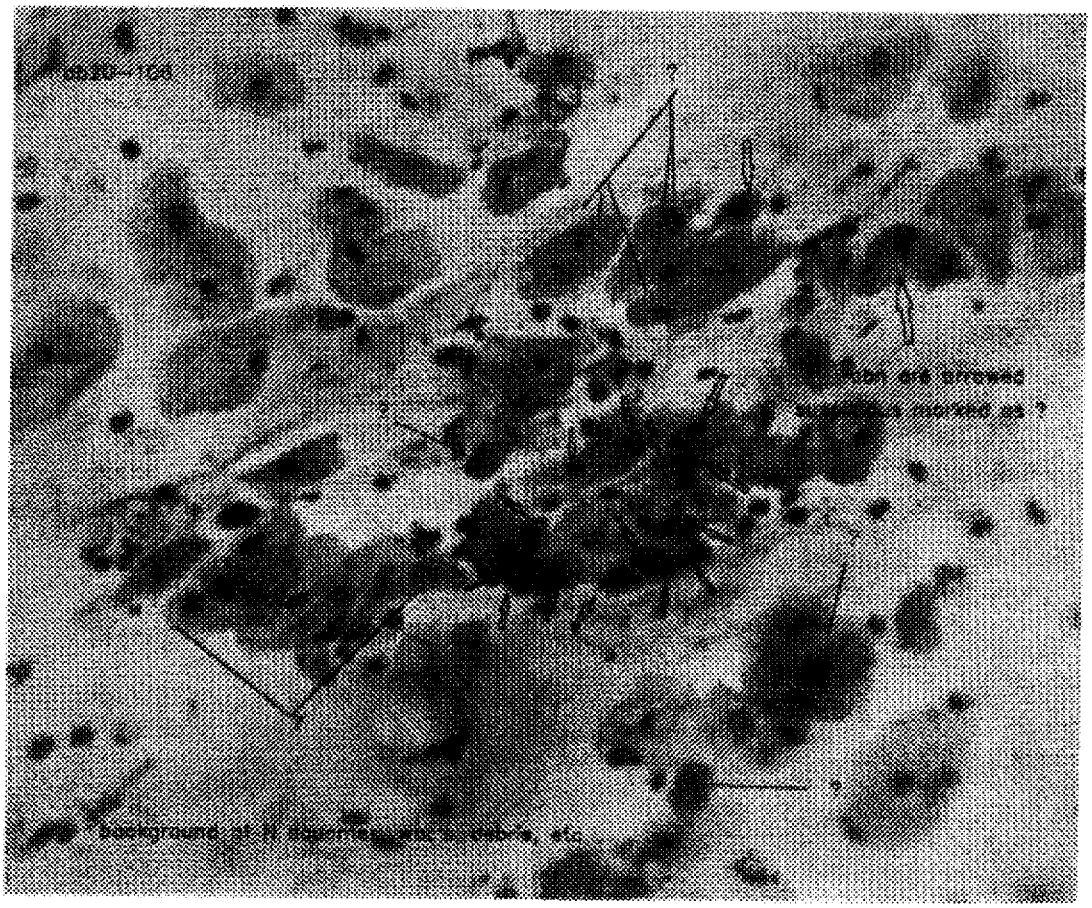
FIG. 11A shows an image from a Pap-smear slide that depicts normal and abnormal squamous cells from the cervix, white blood cells, and background mucus.
Figure 11B:
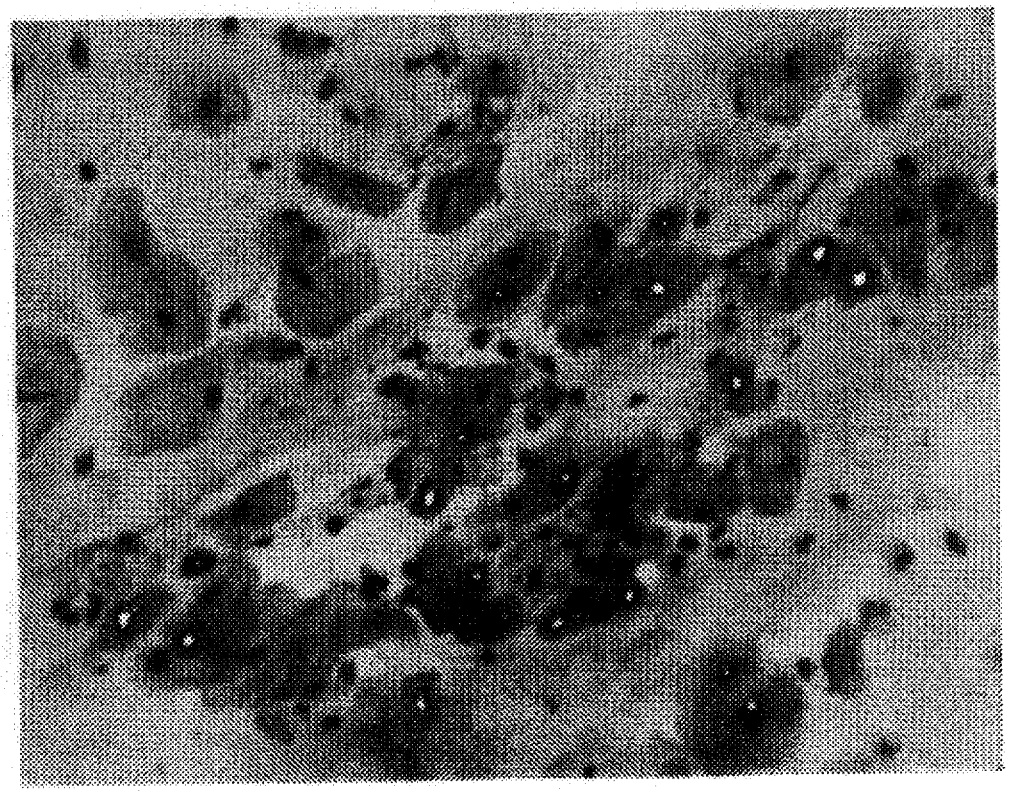
FIG. 11B shows the ROIs as detected by the modified HMT superimposed on that image.

FIG. 11A shows an image from a Pap-smear slide that depicts normal and abnormal squamous cells from the cervix, white blood cells, and background mucus. FIG. 11B shows the ROIs of FIG. 9A superimposed on that image. The ROIs were identified using a computer simulation of the process discussed in FIG. 2. In the computer simulation, the gray-scale image is thresholded to identify all the pixels below 128 gray levels and the HMT process is used to detect any regions in the thresholded image that are roughly circular in shape, with diameters ranging from 12 to 20 micrometers. Specifically, the process of FIG. 2 was implemented for ROI detection on Pap-smears as follows. First, the preprocessed image data was received by ROI detection unit 113 in accordance with step 201. ROI detection unit 113 then detected all regions whose diameter was greater than or equal to 12 micrometers in accordance with step 205 by performing a morphological erosion on the image with a hit structuring element (SE) whose diameter is a first length (here 12 micrometers). Note that selection of a structuring element (SE) depends on what the type of region (i.e., the type of ROI) the process is trying to locate. Here, the ROI are cells and hence the SE is circular, but SEs can be any shape or line of any kind for any given ROI. Also, each ROI is not limited to any one SE. Instead, various SEs can be tried and the SE yielding the best results (the definition "best result" itself depends on the particular application) can be utilized.

Returning to the application of screening cervical smear slides, step 211 involving performance of a miss operation is accomplished as follows. ROI Detection unit 113 detects all of the regions whose diameter is less than or equal to 20 micrometers by erosion of the complement of the input image with a miss SE, whereby the miss SE is an annulus with an inner diameter of 20 micrometers. Step 216 then involves performing a Boolean AND of the results of step 205 and 211 which yields all regions ranging from 12 to 20 micrometers.

Simulations were performed using a disc with a 12 micrometer diameter as the hit kernel and an annulus with an inner diameter of 20 micrometers and an outer diameter of 22 micrometers. Sampling these kernels at 0.8 micrometers/pixel yields a cardinality of 177 and 103 for the hit SE, H and the miss SE, M, respectively. (Cardinality is the number of elements in a set. For a hit SE, it is the number of pixels in the SE with a value=1). Setting the thresholds $T_{hit}$ and $T_{miss}$ at 177 and 103 respectively in (equation 2 above) would detect only those features which matched the circular kernels. An oval feature which is mismatched to these circular kernels can be detected by these kernels only if the thresholds are lower than 177 and 103.

Figure 12:
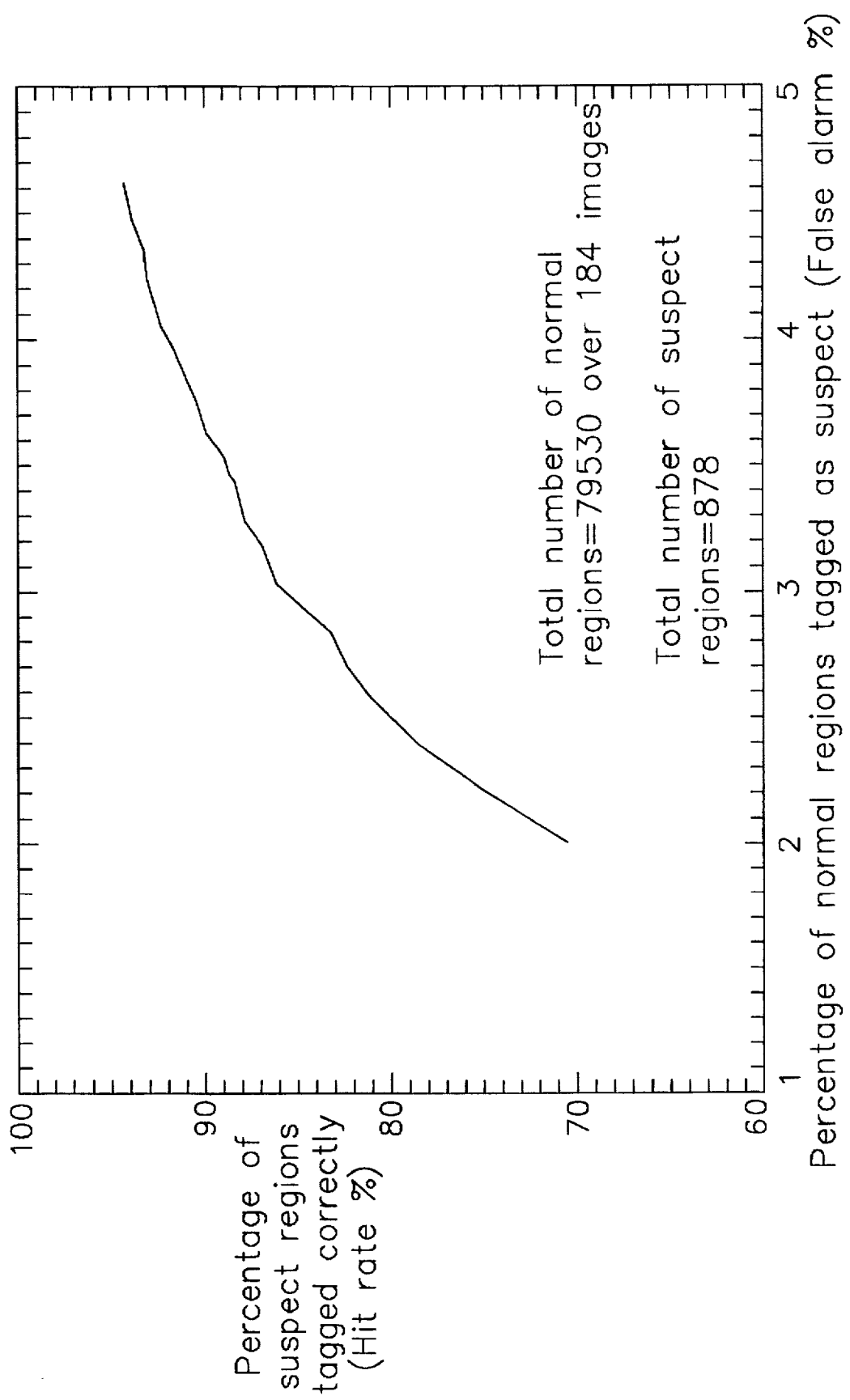
FIG. 12 shows the performance of the modified HMT (the steps of FIG. 2) as a receiver operator curve.

FIG. 12 shows the performance of the modified HMT ((2) above or steps 205, 211 and 216 of FIG. 2) as a receiver operator curve. The hit threshold $T_{hit}$ was set at 89 to allow up to 50% mismatch between the feature and the hit SE. The curve was then obtained by varying $T_{miss}$ from 103 down to 52 which corresponds to a 0% to 50% mismatch respectively between the feature and the miss SE. Note that the top-right-corner of the curve shows that the modified HMT detects 95% of the suspect regions or ROIs correctly while detecting only 4.5% of the normal regions as suspect. This point corresponds to the 50% mismatch in both the hit and miss SE.

System 801 was tested by simulation on 330 pap-smear images using our database and it achieved a detection rate of 85% for a false alarm rate of 5%. Preliminary experimental results yielded a 78% detection rate for a false alarm rate of 8%.

Numerous and additional modifications and variations of the present invention are possible in light of the above teachings. It is therefore to be understood that within the scope of the appended claims, the invention may be practiced otherwise than as specifically claimed.

What is claimed is:

1. An apparatus for detecting regions of interest in input data, comprising:

a hit correlator which includes a hit thresholder, said hit correlator receiving the input data, performing a hit transform on said input data using a hit kernel to yield hit data, thresholding the hit data and outputting resulting thresholded hit data;

a miss correlator which includes a miss thresholder, said miss correlator receiving the input data, performing a miss transform on said input data using a miss kernel to miss data, thresholding the miss data and outputting resulting thresholded miss data, wherein the hit and miss kernels are adapted to together yield hit and miss data corresponding to a range of shapes and/or sizes; and a logically ANDing unit that logically ANDs said resulting thresholded hit data and said resulting thresholded miss data and outputs resulting region of interest data.

2. The apparatus as claimed in claim 1, wherein said input data is modulated onto optical radiation and said hit correlator comprises a spatial light modulator.

3. The apparatus as claimed in claim 2, wherein said input data is modulated onto optical radiation and said hit correlator comprises an electrically addressable spatial light modulator.

4. The apparatus as claimed in claim 2, wherein said input data is modulated onto optical radiation and said hit correlator comprises an optically addressable spatial light modulator.

5. The apparatus as claimed in claim 1, wherein said input data is modulated onto optical radiation and said miss correlator comprises a spatial light modulator.

6. The apparatus as claimed in claim 5, wherein said input data is modulated onto optical radiation and said miss correlator comprises an electrically addressable spatial light modulator.

7. The apparatus as claimed in claim 5, wherein said input data is modulated onto optical radiation and said miss correlator comprises an optically addressable spatial light modulator.

8. The apparatus of claim 1, further comprising a post-processing unit that performs image processing on the resulting region of interest data.

9. The apparatus of claim 1, wherein a size and/or shape of the hit kernel is adjustable.

10. The apparatus of claim 1, wherein a size and/or shape of the miss kernel is adjustable.

11. The apparatus of claim 1, wherein a size and/or shape of both the hit and the miss kernel are adjusted.

12. A system for identifying regions of interest, comprising:

a data acquisition unit for acquiring image data;

a data preprocessing unit for receiving said image data and processing said image data to yield processed image data;

a region of interest processing unit for receiving and performing a modified hit/miss transform on said processed image data, and for outputting resulting region of interest data, whereby said modified hit/miss transform incorporates a hit transform and a hit kernel that yield hit data, a miss transform and a miss kernel that yield miss data, and thresholding, wherein the hit and miss kernels are adapted to together yield hit and miss data corresponding to a range of shapes and/or sizes.

13. The system as claimed in claim 12, wherein said region of interest processing unit comprises a hit correlator and thresholder, which receives said processed image data and processes the hit transform and a hit threshold on said processed image data based on the hit kernel and a hit threshold value.

14. The system as claimed in claim 12, wherein said region of interest processing unit comprises a miss correlator and thresholder, which receives said processed image data and processes the miss transform and a miss threshold on said processed image data based on the miss kernel and a miss threshold value.

15. The system as claimed in claim 12, wherein said region of interest processing unit comprises:
 a hit correlator and thresholder, which receives said processed image data and processes the hit transform and a hit threshold on said processed image data based on the hit kernel and a hit threshold value to yield a correlated and thresholded hit image; and
 a miss correlator and thresholder, which receives said processed image data and processes the miss transform and a miss threshold on said processed image data based on the miss kernel and a miss threshold value to yield a correlated and thresholded miss image.

16. The system as claimed in claim 15, wherein said region of interest processing unit further comprises a logical ANDing unit coupled to said hit correlator and thresholder and to said miss correlator and thresholder which receives and logically ANDs the correlated and thresholded hit image and the correlated and thresholded miss image to yield the resulting region of interest data.

17. The system of claim 12, wherein the region of interest processing unit comprises a post-processing unit that performs image processing on the resulting region of interest data.

18. The apparatus of claim 12, wherein a size and or/shape of the hit kernel is adjustable.

19. The apparatus of claim 12, wherein a size and/or shape of the miss kernel is adjustable.

20. The apparatus of claim 12, wherein a size and/or shape of both the hit and the miss kernel are adjustable.

21. A method for detecting regions of interest in input data, comprising:
 receiving the input data;
 performing a hit transform on said input data using a hit kernel to yield hit data;
 performing a miss transform on said input data using a miss kernel to yield miss data, wherein the hit and miss kernels are adapted to together yield hit and miss data corresponding to a range of shapes and/or sizes;
 thresholding the hit and miss data to yield resulting thresholded hit data and resulting thresholded miss data; and
 logically ANDing said resulting thresholding hit data and said resulting thresholded miss data and outputting resulting region of interest data.

22. The method of claim 21, further comprising the step of performing image processing the resulting region of interest data.

23. The method of claim 21, wherein the hit and miss kernels are adapted by adjusting a size and/or shape of the hit kernel.

24. The method of claim 21, wherein the hit and miss kernels are adapted by adjusting a size and/or shape of the miss kernel.

25. The method of claim 21, wherein the hit and miss kernels are adapted by adjusting a size and/or shape of both the hit and miss kernels.

26. A method for identifying regions of interest, comprising:
 acquiring image data based on radiation scattered from a view;
 performing a hit correlation using a hit kernel to yield hit transform data;
 thresholding said hit transform data to yield modified hit transform data of the view;
 performing a miss correlation using a miss kernel to yield miss transform data;
 thresholding said miss transform data to yield modified miss transform data of the view; and
 outputting data approximately common to said modified hit transform data and said modified miss transform data to yield resulting region of interest data, wherein the hit and miss kernels are adapted to together yield hit and miss transform data corresponding to a range of shapes and/or sizes.

27. The method as claimed in claim 26, wherein said thresholding said hit transform data step comprises retaining only said hit transform data greater than a hit threshold level.

28. The method as claimed in claim 26, wherein said thresholding said miss transform data step comprises retaining only said miss transform data greater than a miss threshold level.

29. The method as claimed in claim 26, wherein said step of thresholding said hit transform data comprises retaining only said hit transform data greater than a hit threshold level, and wherein said thresholding said miss transform data step comprises retaining only said miss transform data greater than a miss threshold level.

30. The method of claim 26, further comprising the step of performing image processing on the resulting region of interest data.

31. The method of claim 26, wherein the hit and miss kernels are adapted by adjusting a size and/or shape of the hit kernel.

32. The method of claim 26, wherein the hit and miss kernels are adapted by adjusting a size and/or shape of the miss kernel.

33. The method of claim 26, wherein the hit and miss kernels are adapted by adjusting a size and/or shape of both the hit and miss kernels.

34. A method for identifying regions of interest, comprising:
 acquiring image data based on radiation scattered from a view;
 performing a hit correlation using a hit kernel to yield hit transform data;
 thresholding said hit transform data to yield modified hit transform data of the view;
 performing a miss correlation using a miss kernel to yield miss transform data;
 thresholding said miss transform data to yield modified miss transform data of the view; and
 logically ANDing said modified hit transform data and said modified miss transform data to yield resulting region of interest data, wherein the hit and miss kernels are adapted to together yield hit and miss transform data corresponding to a range of shapes and/or sizes.

35. The method of claim 34, further comprising the step of performing image processing on the resulting region of interest data.

36. An apparatus for detecting regions of interest in a Pap-smear slide, comprising:

an optical hit correlator which includes a hit thresholder, said optical hit correlator receiving optical radiation with input data modulated thereon by passing through the Pap-smear slide, performing a hit transform on said optical radiation using a hit kernel to yield optical radiation modulated with hit data, thresholding the hit-data-modulated optical radiation and outputting optical radiation with resulting thresholded hit data modulated thereon;

an optical miss correlator which includes a miss thresholder, said optical miss correlator also receiving said optical radiation with input data modulated thereon, performing a miss transform on said optical radiation using a miss kernel to yield a optical radiation modulated with miss data, thresholding the miss-data-modulated optical radiation and outputting optical radiation with resulting thresholded miss data modulated thereon, wherein the hit and miss kernels are adapted to together yield hit-data-modulated and miss-data-modulated optical radiation corresponding to a range of shapes and/or sizes; and a logical ANDing unit that logically ANDs said optical radiation with resulting thresholded hit data modulated thereon and said optical radiation with resulting thresholded miss data modulated thereon and outputs optical radiation with resulting region of interest data modulated thereon.

37. The apparatus of claim 36, further comprising a post-processing unit that performs image processing on the resulting region of interest data.

38. A method for detecting regions of interest in a Pap-smear slide, comprising:

passing optical radiation through the Pap-smear slide to yield modulated optical radiation with input data modulated thereon;

receiving and performing a hit transform on said optical radiation using a hit kernel to yield optical radiation modulated with hit data, thresholding the hit-data-modulated optical radiation and outputting optical radiation with thresholded hit data modulated thereon;

receiving and performing a miss transform on said optical radiation using a miss kernel to yield optical radiation modulated with miss data, thresholding the miss-data-modulated optical radiation and outputting optical radiation with thresholded miss data modulated thereon, wherein the hit and miss kernels are adapted to together yield hit-data-modulated and miss-data-modulated optical radiation corresponding to a range of shapes and/or sizes; and logically ANDing said thresholded hit-data-modulated optical radiation and said thresholded miss-data-modulated optical radiation and outputting optical radiation with resulting region of interest data modulated thereon.

39. The method of claim 38, further comprising the step of performing image processing on the resulting region of interest data.

* * * * *